US006818193B2

(12) United States Patent
Christodoulatos et al.

(10) Patent No.: US 6,818,193 B2
(45) Date of Patent: Nov. 16, 2004

(54) SEGMENTED ELECTRODE CAPILLARY DISCHARGE, NON-THERMAL PLASMA APPARATUS AND PROCESS FOR PROMOTING CHEMICAL REACTIONS

(75) Inventors: Christos Christodoulatos, Somerset, NJ (US); George Korfiatis, Basking Ridge, NJ (US); Richard Crowe, Hazlet, NJ (US); Erich E Kunhardt, Hoboken, NJ (US)

(73) Assignees: Plasmasol Corporation, Hoboken, NJ (US); Stevens Institute of Technology, LLC, Hoboken, NJ (US)

( * ) Notice: Subject to any disclaimer, the term of this patent is extended or adjusted under 35 U.S.C. 154(b) by 204 days.

(21) Appl. No.: 09/738,923

(22) Filed: Dec. 15, 2000

(65) Prior Publication Data

US 2001/0031234 A1 Oct. 18, 2001

Related U.S. Application Data

(60) Provisional application No. 60/171,324, filed on Dec. 21, 1999, and provisional application No. 60/171,198, filed on Dec. 15, 1999.

(51) Int. Cl.[7] ............................ B01D 53/00; H05F 3/04

(52) U.S. Cl. .................... 423/210; 204/157.3; 204/159; 204/164; 204/177; 204/179; 313/231; 313/410; 315/111.21; 315/111.81; 422/186.04; 423/235; 423/242.1; 423/245.1; 423/581

(58) Field of Search .............................. 204/157.3, 159, 204/164, 177, 179; 313/231, 410; 315/111.21, 21–111.81; 422/186.04; 423/210, 235, 242.1, 245.1, 581

(56) References Cited

U.S. PATENT DOCUMENTS

| | | | |
|---|---|---|---|
| 3,594,065 A | 7/1971 | Marks | |
| 4,698,551 A | 10/1987 | Hoag | 313/619 |
| 4,885,074 A | 12/1989 | Susko et al. | 204/298 |
| 5,033,355 A | 7/1991 | Goldstein et al. | 89/8 |
| 5,062,708 A | 11/1991 | Liang et al. | 356/316 |
| 5,084,239 A | 1/1992 | Moulton et al. | |

(List continued on next page.)

FOREIGN PATENT DOCUMENTS

| | | |
|---|---|---|
| EP | 1084713 | 3/2001 |
| EP | 1378253 | 1/2004 |

OTHER PUBLICATIONS

Kolman et al., "Genotoxic effects of ethylene oxide, propylene oxide and epichlorohydrin in humans: update review" (1990–2000), Mutation Research 512 (2002) 173–194.

(List continued on next page.)

*Primary Examiner*—Steven Bos
*Assistant Examiner*—Maribel Medina
(74) *Attorney, Agent, or Firm*—Darby & Darby

(57) ABSTRACT

A plasma reactor including a first dielectric having at least one capillary defined therethrough, and a segmented electrode including a plurality of electrode segments, each electrode segment is disposed proximate an associated capillary. Each electrode segment may be formed in different shapes, for example, a pin, stud, washer, ring, or disk. The electrode segment may be hollow, solid, or made from a porous material. The reactor may include a second electrode and dielectric with the first and second dielectrics separated by a predetermined distance to form a channel therebetween into which the plasma exiting from the capillaries in the first dielectric is discharged. The fluid to be treated is passed through the channel and exposed to the plasma discharge. If the electrode segment is hollow or made of a porous material, then the fluid to be treated may be fed into the capillaries in the first dielectric and exposed therein to the maximum plasma density. The fluid to be treated may be exposed to the plasma discharge both in the capillaries as well as in the channel between the two dielectrics. The plasma reactor is more energy efficient than conventional devices and does not require a carrier gas to remain stable at atmospheric pressure. The plasma reactor has a wide range of application, such as the destruction of pollutants in a fluid, the generation of ozone, the pretreatment of air for modifying or improving combustion, and the destruction of various organic compounds, and surface cleaning of objects.

40 Claims, 23 Drawing Sheets

U.S. PATENT DOCUMENTS

| | | | | | |
|---|---|---|---|---|---|
| 5,115,166 | A | | 5/1992 | Campbell et al. | |
| 5,178,829 | A | | 1/1993 | Moulton et al. | |
| 5,184,046 | A | | 2/1993 | Campbell | |
| 5,186,893 | A | | 2/1993 | Moulton et al. | |
| 5,288,460 | A | | 2/1994 | Caputo et al. | |
| 5,325,020 | A | | 6/1994 | Campbell et al. | |
| 5,376,332 | A | | 12/1994 | Martens et al. | |
| 5,387,842 | A | | 2/1995 | Roth et al. | |
| 5,408,160 | A | | 4/1995 | Fox | |
| 5,413,758 | A | | 5/1995 | Caputo et al. | |
| 5,413,759 | A | | 5/1995 | Campbell et al. | |
| 5,413,760 | A | | 5/1995 | Campbell et al. | |
| 5,414,324 | A | | 5/1995 | Roth et al. | |
| 5,472,664 | A | | 12/1995 | Campbell et al. | |
| 5,476,501 | A | | 12/1995 | Stewart et al. | 607/127 |
| 5,482,684 | A | | 1/1996 | Martens et al. | |
| 5,498,526 | A | | 3/1996 | Caputo et al. | |
| 5,593,550 | A | * | 1/1997 | Stewart et al. | 204/164 |
| 5,593,649 | A | | 1/1997 | Fisher et al. | |
| 5,594,446 | A | | 1/1997 | Vidmar et al. | 342/1 |
| 5,603,895 | A | | 2/1997 | Martens et al. | |
| 5,620,656 | A | | 4/1997 | Wensky et al. | |
| 5,645,796 | A | | 7/1997 | Caputo et al. | |
| 5,650,693 | A | | 7/1997 | Campbell et al. | |
| 5,667,753 | A | | 9/1997 | Jacobs et al. | |
| 5,669,583 | A | | 9/1997 | Roth | |
| 5,686,789 | A | | 11/1997 | Schoenbach et al. | |
| 5,753,196 | A | | 5/1998 | Martens et al. | |
| 5,872,426 | A | | 2/1999 | Kunhardt et al. | 313/582 |
| 5,939,829 | A | | 8/1999 | Schoenbach et al. | |
| 6,005,349 | A | | 12/1999 | Kunhardt et al. | 313/111.21 |
| 6,027,616 | A | | 2/2000 | Babko-Malyi | 204/164 |
| 6,055,349 | A | | 4/2000 | Seino et al. | 315/111.21 |
| 6,146,724 | A | | 11/2000 | Roth | |
| 6,147,452 | A | | 11/2000 | Kunhardt et al. | 313/582 |
| 6,170,668 | B1 | | 1/2001 | Babko-Malyi | |
| 6,232,723 | B1 | | 5/2001 | Alexeff | |
| 6,245,126 | B1 | | 6/2001 | Feldman et al. | 95/59 |
| 6,245,132 | B1 | | 6/2001 | Feldman et al. | 96/28 |
| 6,255,777 | B1 | | 7/2001 | Kim et al. | |
| 6,322,757 | B1 | | 11/2001 | Cohn et al. | 422/186.04 |
| 6,325,972 | B1 | | 12/2001 | Jacobs et al. | |
| 6,333,002 | B1 | | 12/2001 | Jacobs et al. | |
| 6,365,112 | B1 | | 4/2002 | Babko-Malyi et al. | |
| 6,372,192 | B1 | | 4/2002 | Paulauskas et al. | 423/447.1 |
| 6,375,832 | B1 | | 4/2002 | Eliasson et al. | 208/141 |
| 6,383,345 | B1 | | 5/2002 | Kim et al. | |
| 6,395,197 | B1 | | 5/2002 | Detering et al. | 252/373 |
| 6,399,159 | B1 | | 6/2002 | Grace et al. | 427/536 |
| 6,433,480 | B1 | | 8/2002 | Stark et al. | |
| 6,451,254 | B1 | | 9/2002 | Wang et al. | |
| 6,458,321 | B1 | | 10/2002 | Platt, Jr. et al. | |
| 6,475,049 | B2 | | 11/2002 | Kim et al. | |
| 6,497,839 | B1 | | 12/2002 | Kasegawa et al. | |
| 6,509,689 | B1 | | 1/2003 | Kim et al. | |
| 6,545,411 | B1 | | 4/2003 | Kim et al. | |
| 6,548,957 | B1 | | 4/2003 | Kim et al. | |
| 6,570,172 | B2 | | 5/2003 | Kim et al. | |
| 6,580,217 | B2 | | 6/2003 | Kim et al. | |
| 6,598,481 | B1 | | 7/2003 | Schultz | |
| 6,599,471 | B2 | | 7/2003 | Jacobs et al. | |
| 6,627,150 | B1 | | 9/2003 | Wang et al. | |
| 6,632,323 | B2 | | 10/2003 | Kim et al. | |
| 6,673,522 | B2 | | 1/2004 | Kim et al. | |
| 6,685,523 | B2 | | 2/2004 | Kim et al. | |
| 2002/0011203 | A1 | | 1/2002 | Kim | |
| 2002/0011770 | A1 | | 1/2002 | Kim et al. | |
| 2002/0045396 | A1 | | 4/2002 | Kim | |
| 2002/0092616 | A1 | | 7/2002 | Kim | |
| 2002/0105259 | A1 | | 8/2002 | Kim | |
| 2002/0105262 | A1 | | 8/2002 | Kim | |
| 2002/0122896 | A1 | | 9/2002 | Kim et al. | |
| 2002/0124947 | A1 | | 9/2002 | Kim | |
| 2002/0126068 | A1 | | 9/2002 | Kim et al. | |
| 2002/0127942 | A1 | | 9/2002 | Kim et al. | |
| 2002/0139659 | A1 | | 10/2002 | Yu et al. | |
| 2002/0144903 | A1 | | 10/2002 | Kim et al. | |
| 2002/0148816 | A1 | | 10/2002 | Jung et al. | |
| 2002/0187066 | A1 | | 12/2002 | Yu et al. | |
| 2003/0003767 | A1 | | 1/2003 | Kim et al. | |
| 2003/0015505 | A1 | | 1/2003 | Yu et al. | |
| 2003/0035754 | A1 | | 2/2003 | Sias et al. | |
| 2003/0048240 | A1 | | 3/2003 | Shin et al. | |
| 2003/0048241 | A1 | | 3/2003 | Shin et al. | |
| 2003/0062837 | A1 | | 4/2003 | Shin et al. | |
| 2003/0070760 | A1 | | 4/2003 | Kim et al. | |
| 2003/0071571 | A1 | | 4/2003 | Yu et al. | |
| 2003/0085656 | A1 | | 5/2003 | Kunhardt et al. | |
| 2003/0127984 | A1 | | 7/2003 | Kim et al. | |
| 2003/0134506 | A1 | | 7/2003 | Kim et al. | |
| 2003/0141187 | A1 | | 7/2003 | Sohn et al. | |

OTHER PUBLICATIONS

Schoenbach et al., "Special Issue on Nonthermal Medical/Biological Treatments Using Electromagnetic Fields and Ionized Gasses", IEEE Transactions on Plasma Science, vol. 28, No. 1, Feb. 2000.

Jacobs, "STERRAD 100S" Sterilization System; Advanced Sterillization products a Johnson & Johnson Company, 1999 Advanced Sterilization Products.

Sharpless et al. "Interaction of Organophosphonates with $O(^3P)$, $N(^4S)$, )2($a^1g$), and $O_3$", Non–Thermal Plasma Techniques or Pollution control, Nato ASI Series, vol. G 34,Part A, p. 123–137 (1993).

Paur, "Removal of Volatile Hydrocarbons From Industrial Off–Gas", Non–Thermal Plasma Techniques for Pollution Control, Nato ASI Series, vol. G34 Part B, p. 77–89 (1993).

Mizuno et al. "Application of Corona Technology in the Reduction of Greenhouse gases and Other Gaseous Pollutants", Non–Thermal Plasma Techniques for Pollution Control, Nato ASI Series vol. G34 Part B. 165–185 (1993).

Yamamoto et al., "Decomposition of Volatile Organic Compounds By a Packed–Bed Reactor and a Pulsed–Corona Plasma Reactor", Non–Thermal Plasma Techniques for Pollution Control, Nato ASI Series, vol. G34, Part B, p. 223–237 (1993).

Rosocha et al., Treatment of Hazardous Organic Wastes Using Silent Discharge Plasmas, Non–Thermal Plasma Techniques for Pollution Control, Nato ASI Series vol. G34 Part B, p. 281–308 (1993).

Babko–Malyi, Sergei and Nelson, Gordon L., "Experimental Evaluation of Capillary Korona Discharges", American Institute of Aeronautics and Astronautics, 30th Plasmadynamics and Lasers Conference: AIAA–99–3488 (Jun. 28–Jul. 1, 1999), pp. 1–14.

Stark et al., "Direct Current Glow Discharges in Atmospheric Air", American Institute of Aeronautics and Astronautics, 30th Plasmadynamics and Lasers Conference: AIAA–99–3666 (Jun. 28–Jul. 1, 1999), pp. 1–5.

Babko–Malyi, Sergei, "Ion–drift Reactor Concept", Fuel Processing Technology (1999), pp. 231–246.

Vidmar, R.J., "On the Use of Atmospheric Pressure Plasma as Electromagnetic Reflectors and Absorbers", *IEEE Transactions on Plasma Science*, vol. 18 No. 4, Aug. 1990.

Kunhardt, E.E., "Generation of Large–Volume, Atmosphereic–Pressure, Nonequilibrium Plasmas", *IEEE Transactions on Plasma Science*, vol. 28 No. 1, pp. 189–200, Feb. 2000.
Penetrante et al., "Non–Thermal Plasma Techniques for Abatement of Violatile Organic Compounds and Nitrogen Oxides", *INP Report XIII*, pp. 18–46 (1996).
Chen D.C.C., Lawton, J., and Weinberg, F.K., *Tenth Symposium on Combustion*, pp. 743–754 (1965).
Tarnovsky, V. and Becker, K., *Plasma Sources Science and Technology*, vol. 4, No. 307 (1995).
Knight, Henry de Boyne, the Arc Discharge; its application to power control, *London Chapman & Hall* (1960).
L.A. Rosenthal and D.A. Davis, "Electrical Characterization of a Corona Discharge for Surface Treatment", *IEEE Transaction on Industry Applications*, vol. 1A–11, No. 3, pp. 328–335 (May/Jun. 1975).

S. Han, Y. Lee, H. Kim, J. Lee, J. Yoon, and G. Kim, "Polymer Surface Modification by Plasma Source Ion Implantation", *Surfaces and Coatings Technology*, vol. 93, pp. 261–264 (1997).

* cited by examiner 305
310'
300
355
360
350

335
345
330
340
325
315
320
310
350

Figure 5b – Top View
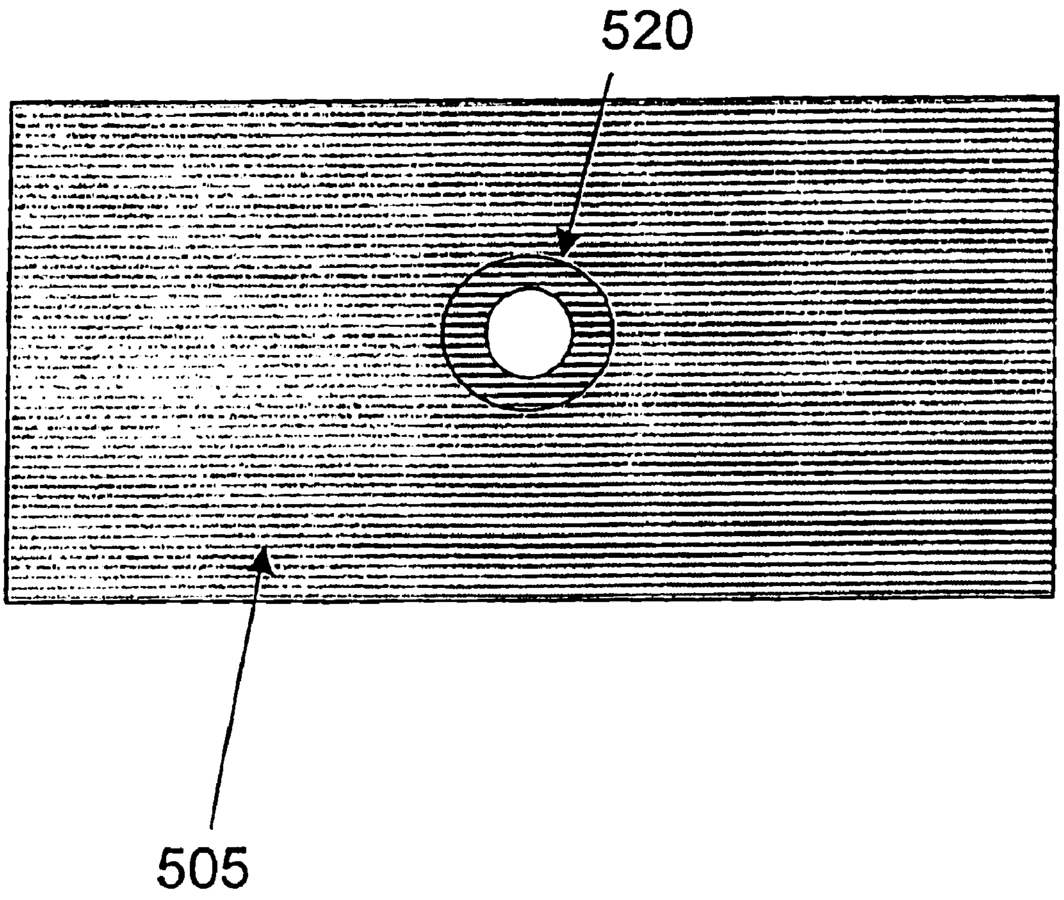

SEGMENTED ELECTRODE CAPILLARY DISCHARGE, NON-THERMAL PLASMA APPARATUS AND PROCESS FOR PROMOTING CHEMICAL REACTIONS

CROSS-REFERENCE TO RELATED APPLICATIONS

This application claims the benefit of U.S. Provisional Application No. 60/171,198, filed Dec. 15, 1999 and U.S. Provisional Application No. 60/171,324, filed Dec. 21, 1999, are all hereby incorporated by reference in their entirety.

BACKGROUND OF THE INVENTION

1. Field of the Invention

The present invention is directed to system and method for generating plasma discharge and, in particular, to a segmented electrode capillary discharge, non-thermal plasma process and apparatus.

2. Description of Related Art

A "plasma" is a partially ionized gas composed of ions, electrons, and neutral species. This state of matter is produced by relatively high temperatures or relatively strong electric fields either constant (DC) or time varying (e.g., RF or microwave) electromagnetic fields. Discharged plasma is produced when free electrons are energized by electric fields in a background of neutral atoms/molecules. These electrons cause electron atom/molecule collisions which transfer energy to the atoms/molecules and form a variety of species which may include photons, metastables, atomic excited states, free radicals, molecular fragments, monomers, electrons, and ions. The neutral gas becomes partially or fully ionized and is able to conduct currents. The plasma species are chemically active and/or can physically modify the surface of materials and may therefore serve to form new chemical compounds and/or modify existing compounds. Discharge plasmas can also produce useful amounts of optical radiation to be used for lighting. Many other uses for plasma discharge are available.

U.S. Pat. Nos. 5,872,426; 6,005,349; and 6,147,452, each of which are herein incorporated by reference, describe a glow plasma discharge device for stabilizing glow plasma discharges by suppressing the transition from glow-to-arc. A dielectric plate having an upper surface and a lower surface and a plurality of holes extending therethrough is positioned over a cathode plate and held in place by a collar. Each hole in the dielectric acts as a separate active current limiting micro-channel that prevents the overall current density from increasing above the threshold for the glow-to-arc transition. This conventional use of a cathode plate is not efficient in that it requires the input of a relatively high amount of energy. In addition, the reactor requires a carrier gas such as Helium or Argon to remain stable at atmospheric pressure.

It is therefore desirable to develop a device that solves the aforementioned problem.

SUMMARY OF THE INVENTION

The present invention consists of a system for generating non-thermal plasma reactor system to facilitate chemical reactions. Chemical reactions are promoted by making use of the non-thermal plasma generated in a segmented electrode capillary discharge non-thermal plasma reactor, which can operate under various pressure and temperature regimes including ambient pressure and temperature. The device uses a relatively large volume, high density, non-thermal plasma to promote chemical reaction upon whatever fluid is passed through the plasma (either passed through the capillary or passed transverse through the resulting plasma jet from the capillary. Examples of the chemistry, which could be performed using this method, include the destruction of pollutants in a fluid stream, the generation of ozone, the pretreatment of air for modifying or improving combustion, the destruction of various organic compounds, or as a source of light. Additionally, chemistry can be performed on the surface of dielectric or conductive materials by the dissociation and oxidation of their molecules. In the case of pure hydrocarbons complete molecular conversion will result in the formation of carbon dioxide and water, which can be released directly to the atmosphere.

The reactor in accordance with the present invention is designed so that the gaseous stream containing chemical agents such as pollutants are exposed to the relatively high density plasma region where various processes such as oxidation, reduction, ion induced decomposition, or electron induced decomposition efficiently allow for chemical reactions to take place. The ability to vary the plasma characteristics allows for tailored chemical reactions to take place by using conditions that effectively initiates or promotes the desired chemical reaction and not heat up the bulk gases.

In a preferred embodiment of the present invention the plasma reactor includes a first dielectric having at least one capillary defined therethrough, and a segmented electrode including a plurality of electrode segments, each electrode segment is disposed proximate an associated capillary. Each electrode segment may be formed in different shapes, for example, a pin, stud, washer, ring, or disk. The electrode segment may be hollow, solid, or made from a porous material. The reactor may include a second electrode and dielectric with the first and second dielectrics separated by a predetermined distance to form a channel therebetween into which the plasma exiting from the capillaries in the first dielectric is discharged. The fluid to be treated is passed through the channel and exposed to the plasma discharge. If the electrode segment is hollow or made of a porous material, then the fluid to be treated may be fed into the capillaries in the first dielectric and exposed therein to the maximum plasma density. The fluid to be treated may be exposed to the plasma discharge both in the capillaries as well as in the channel between the two dielectrics. The plasma reactor is more energy efficient than conventional devices and does not require a carrier gas to remain stable at atmospheric pressure. The plasma reactor has a wide range of application, such as the destruction of pollutants in a fluid, the generation of ozone, the pretreatment of air for modifying or improving combustion, and the destruction of various organic compounds, and surface cleaning of objects.

The present invention is directed to a plasma reactor including a first dielectric having at least one capillary defined therethrough, and a segmented electrode including a plurality of electrode segments, each electrode segment disposed proximate an associated capillary.

In addition, the present invention also provides a method of treating a fluid in a plasma reactor as described above. Initially, a fluid to be treated is passed through one or more electrode segments and associated capillaries. The fluid is able to pass through the electrode segment if the segment is hollow or made of a porous material. The fluid to be treated while being passed through the capillary is exposed to the plasma discharge prior to exiting from the capillary. In addition, or instead of, passing the fluid to be treated through the electrode segment, the fluid to be treated may be passed through a channel defined between the first dielectric and a second dielectric. In the channel, the fluid to be treated is exposed to plasma discharged from the capillary. Accordingly, the fluid to be treated may be passed and exposed to the maximum plasma density in the capillaries defined in the first dielectric as well as in the plasma region (channel) between the two dielectrics.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which:

FIG. 5*b* is a top view of the electrode segment of FIG. 5*a;*

DETAILED DESCRIPTION OF THE INVENTION

The segmented electrode capillary discharge, non-thermal plasma reactor in accordance with the present invention is designed so that a solid or a fluid (e.g., a liquid, vapor, gas, or any combination thereof) containing chemical agents, for example, an atomic element or a compound, is exposed to a relatively high density plasma in which various processes, such as oxidation, reduction, ion induced composition, and/or electron induced composition, efficiently allow for chemical reactions to take place. By way of example, the chemical agents may be Volatile Organic Compounds, Combustion Air or Combustion Exhaust Gases. The ability to vary the energy density allows for tailored chemical reactions to take place by using enough energy to effectively initiate or promote desired chemical reactions without heating up the bulk gas.

By way of example the present invention will be described with respect to the application of using the plasma reactor to purify or treat a contaminated fluid. It is, however, within the intended scope of the invention to use the device and method for other applications.

Figure 1A:
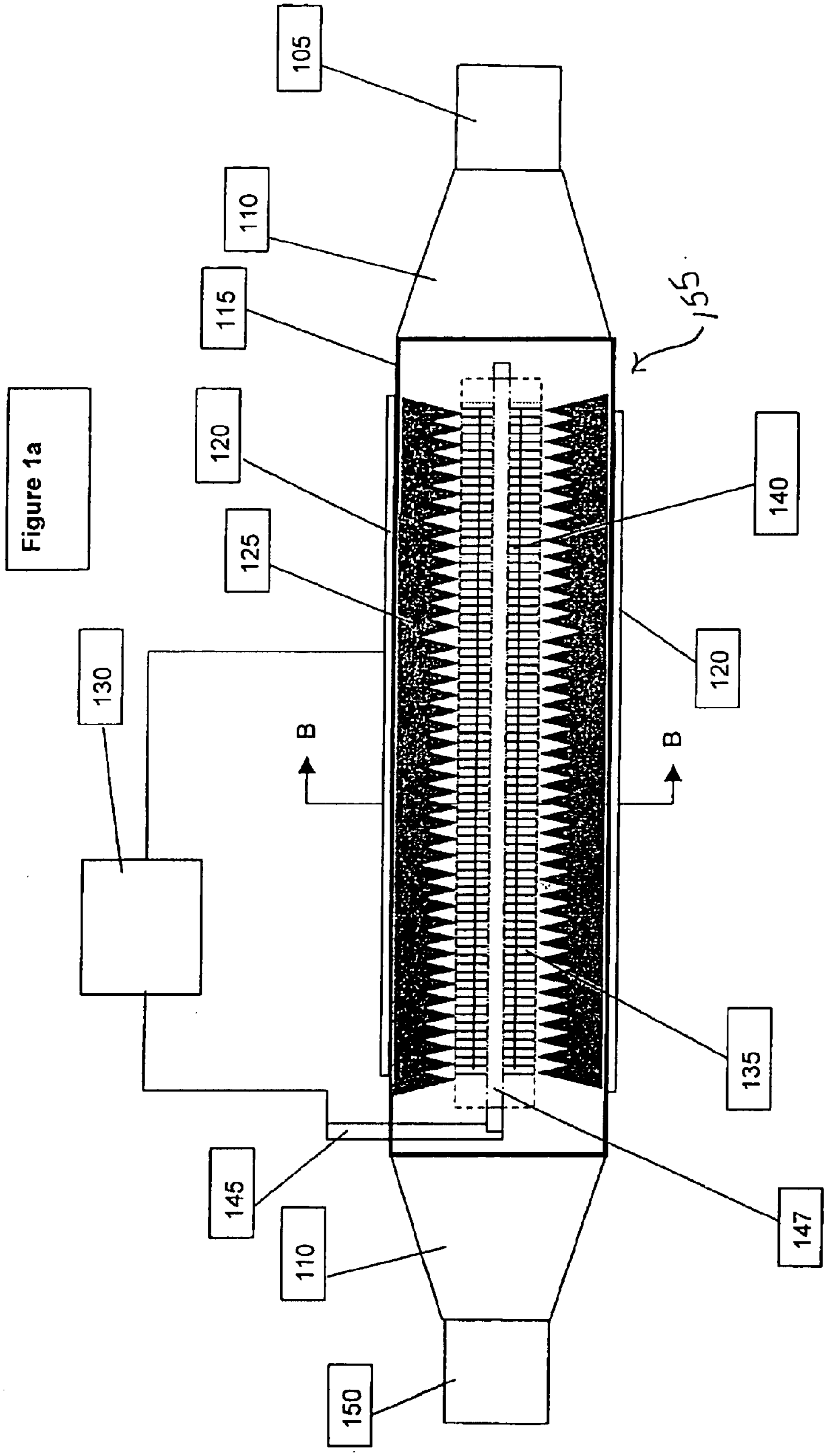
FIG. 1*a* is a cross-sectional longitudinal view of an exemplary single annular segmented electrode capillary discharge plasma reactor system in accordance with the present invention.
Figure 1B:
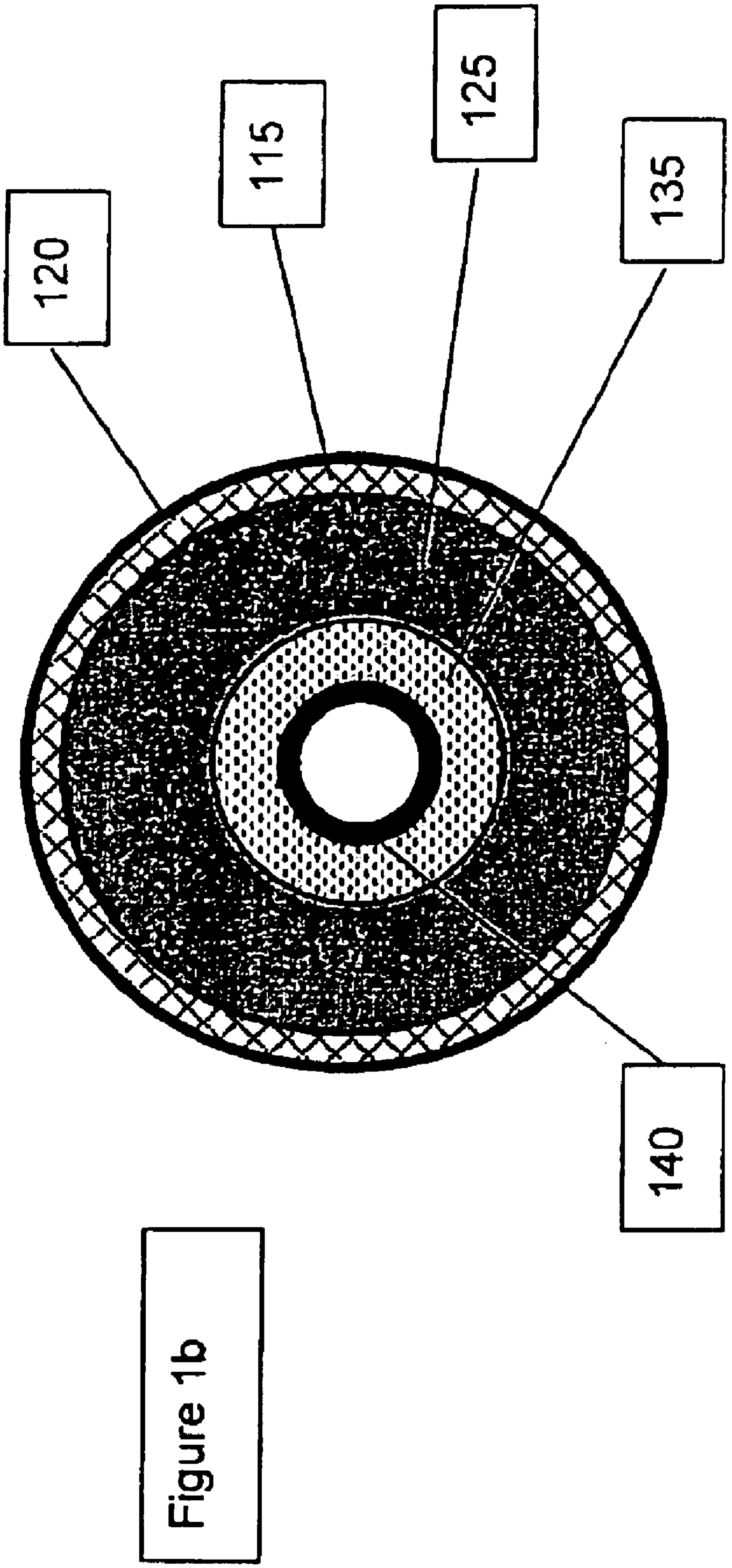
FIG. 1*b* is a cross-sectional lateral view of the plasma reactor system of FIG. 1*a* along line B—B.

Longitudinal and lateral cross-sectional views of an exemplary single annular segmented electrode capillary discharge plasma reactor system in accordance with the present invention are shown in FIGS. 1*a* and 1*b,* respectively. The single annular segmented electrode capillary discharge plasma reactor 100 in FIG. 1*a* includes an inlet 150 for receiving the fluid to be treated. A flow transition conduit 110 is disposed between the inlet 150 and a reaction chamber 155 to streamline the flow of fluid to be treated. That is, the flow transition conduit 110 distributes the fluid to be treated substantially uniformly prior to its introduction into the reaction chamber 155. Reaction chamber 155 includes a second dielectric 115 and a second electrode 120. The second electrode 120 is disposed circumferentially about at least a portion of the outer surface of a second dielectric 115 and extends in a longitudinal direction along at least a portion of the length of the reaction chamber 155. In a preferred embodiment, the second electrode is insulated and composed of a metallic or non-metallic conductor. Throughout the description of the invention any conventional material may be used as a dielectric such as glass or ceramic.

Disposed inside the reaction chamber 155 is a hollow tube 147 perforated with holes. A first dielectric 135 having capillaries 148 defined therein is disposed about the hollow tube 147. The first and second dielectrics may be the same or different materials. Interposed between the hollow tube 147 and first dielectric 135 is a segmented electrode 140 comprising a plurality of electrode segments. A power supply 130 is connected to the second electrode 120 and the segmented electrode 140. Although shown in FIG. 1*a* as a plate, the second electrode 120 may alternatively be a segmented electrode comprising a plurality of electrode segments. Alternatively, the second electrode 120 and second dielectric 115 may be eliminated altogether.

Figures 1C, 1D:
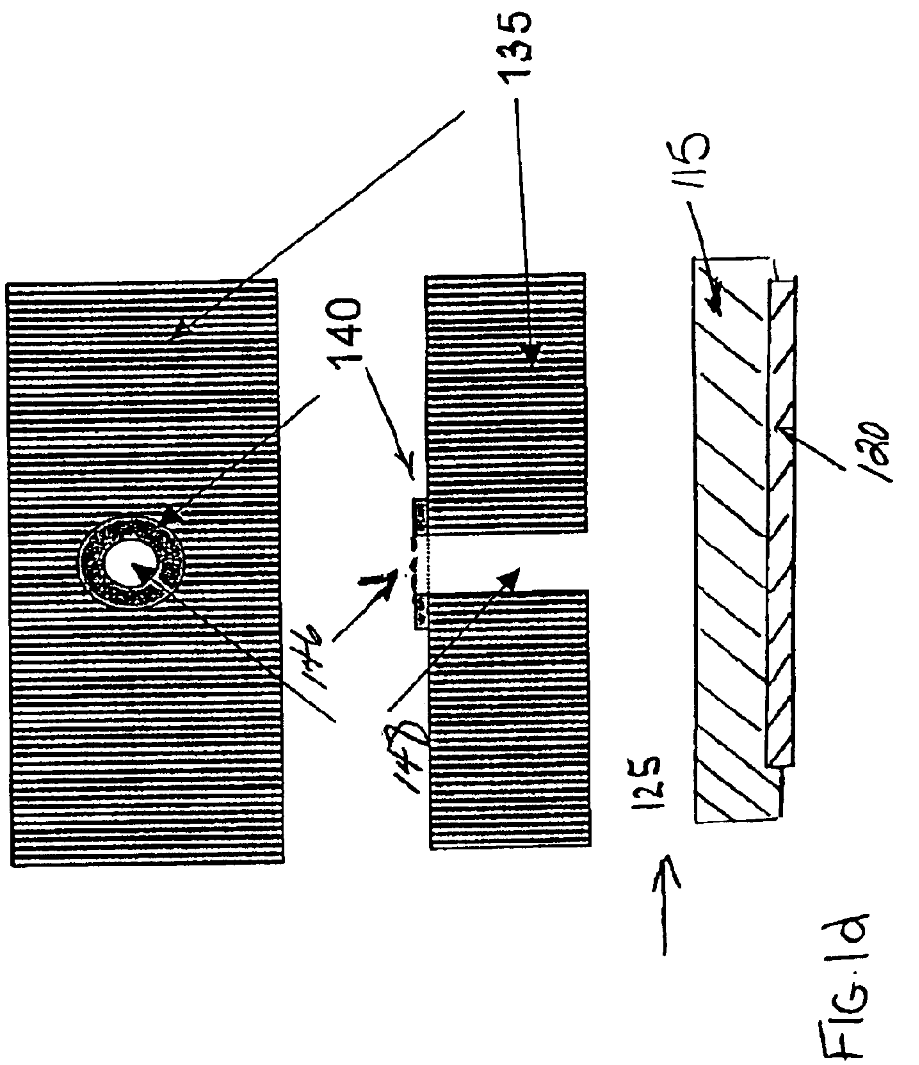
FIG. 1*c* is an enlarged top view of a single electrode segment and associated capillary in the plasma reactor system in FIG. 1*a;*
FIG. 1*d* is an enlarged cross-sectional view of the arrangement of a single electrode segment and associated capillary in the reactor system in FIG. 1*a;*

In the embodiment shown in FIG. 1*a,* each electrode segment 140 is in the shape of a ring or washer having a hole 146 defined therethrough. Enlarged top and cross-sectional views of a single electrode segment 140 in the shape of a hollow ring are shown in FIGS. 1*c* and 1*d,* respectively. The hollow ring shaped electrode segment 140 is disposed in contact with the first dielectric 135. In an alternative embodiment, electrode segment 140 may be disposed above and separated from the first dielectric 135 by a predetermined distance, or extend any desired depth into the capillary 148. The electrode segment 140 is arranged so that the holes in the hollow tube 147, the holes 146 in the electrode segments 140, and the capillaries 148 defined in the first dielectric 135 are substantially aligned with one another. Holes in the hollow tube 147 and electrode segment 140 provide a conduit through which the fluid to be treated may be passed and exposed to the maximum plasma density in the capillaries 148 defined in the first dielectric 135 as well as in the plasma region between the two dielectrics 115, 135. It is within the scope of the invention to eliminate the hollow tube 147 altogether and merely expose or treat the contaminated fluid in the plasma region between the two dielectrics.

Plasma is generated in a channel 125 between the dielectrics 115, 135 and in the capillaries 148 defined in the first dielectric 135. The capillaries 148 defined in the first dielectric 135 can vary in diameter, preferably from a few microns to a few millimeters, and can also vary in density or spacing relative to one another. The density or spacing of the capillaries 148 may be varied, as desired, so as to generate a plasma discharge over a portion of the entire length of the reaction chamber 155. In addition, the diameter of the capillaries 148 may be selected so as to obtain a desired capillary plasma action.

In operation, fluid to be treated is received at the inlet 150 and passed through the transition conduit 110 into the channel 125 of the reaction chamber 155. If the electrode segments 140 are hollow, as shown in FIG. 1*d,* then the fluid to be treated may also be passed through the electrode segments 140 and into the capillaries 148. A capillary plasma discharge is created in the capillaries 148 and the channel 125 upon the application of a voltage from the power supply 130. The plasma discharge produces chemical reactions that destroy the contaminants in the fluid to be treated. Accordingly, treatment of the contaminated fluid by exposure to the plasma may occur in the capillaries 148 and/or the channel 125. The plasma generated in the capillaries and channel promotes chemical reactions that facilitate processes such as the destruction of contaminants.

Figure 1E:
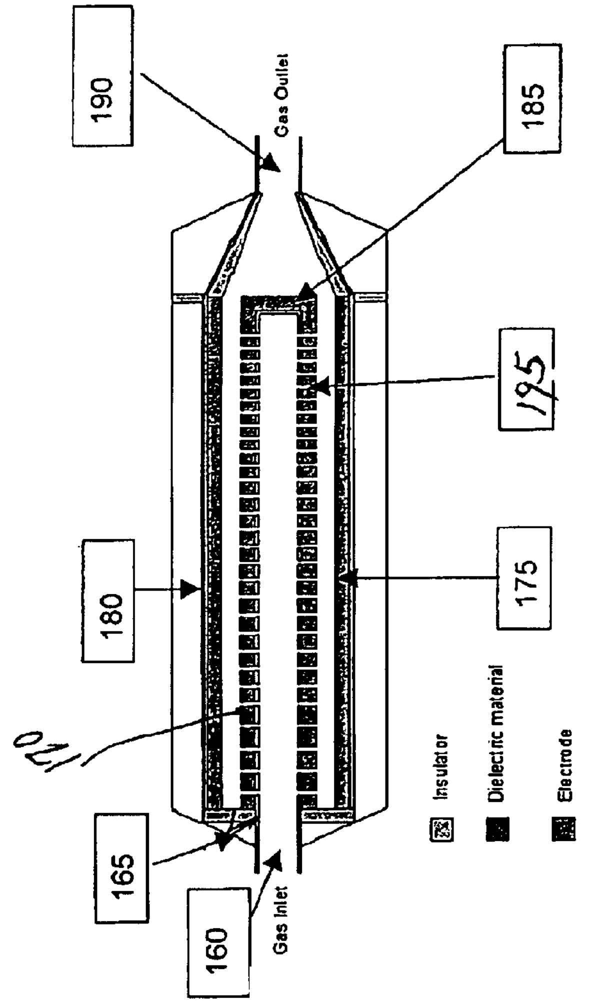
FIG. 1*e* is a cross-sectional longitudinal view of another embodiment of a single annular segmented electrode capillary discharge plasma reactor system in accordance with the present invention with a hollow inner segmented electrode having a substantially uniform thickness and varied capillary hole density in the first dielectric.
Figure 1F:
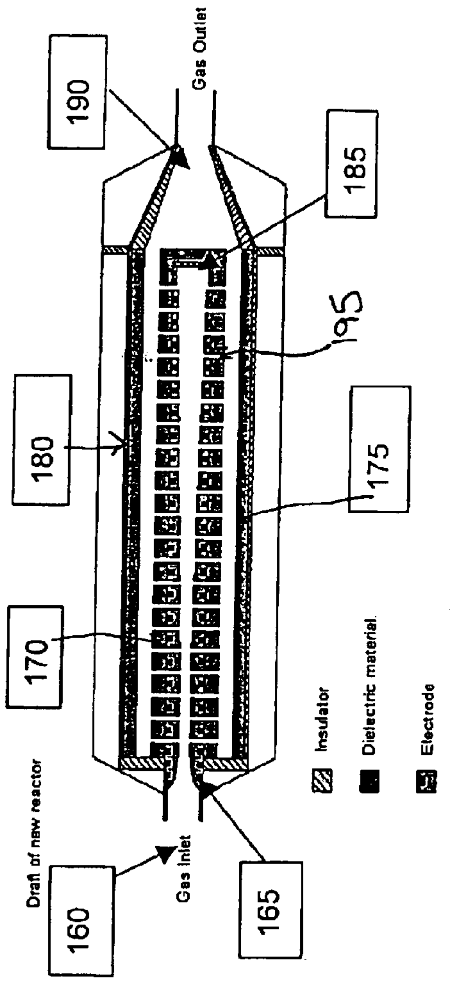
FIG. 1*f* is a cross-sectional longitudinal view of yet another embodiment of a single annular segmented electrode capillary discharge plasma reactor system in accordance with the present invention with a hollow inner segmented electrode having a non-uniform thickness and substantially uniform capillary hole density in the first dielectric.

FIGS. 1*e* and 1*f* show exemplary alternative embodiments of a single annular segmented electrode capillary discharge plasma reactor in accordance with the present invention. Unlike the embodiment shown in FIG. 1*a* in which the reactor chamber 155 includes a hollow tube, in FIGS. 1*e* and 1*f,* the hollow tube 147 may be eliminated as a result of using a U-shaped inner electrode 165. In both embodiments, the fluid to be treated is exposed to the maximum plasma density in the capillaries 195 defined in the first dielectric 170 as well as in the plasma region between the two dielectrics 170, 175. The reaction chamber in FIGS. 1*e* and 1*f* has an inlet 160 directly connected to a plurality of electrode segments that together form a hollow inner segmented electrode 165 in contact with a first dielectric 170. Capillaries 195 are defined in the first dielectric 170 along its length in a longitudinal direction. Opposite its open end the first dielectric 170 has a closed end 185, proximate an outlet 190, to prevent the fluid to be treated from escaping from the reaction chamber without being subject to chemical reactions when exposed to the plasma.

Despite their overall similar configuration, the embodiments shown in FIGS. 1*e* and 1*f* differ with respect to the first dielectric and inner segmented electrode. In FIG. 1*e,* inner segmented electrode 165 has a substantially uniform cross-section (thickness) and variable capillary hole density (spacing) defined in the first dielectric 170 along the longitudinal length of the reaction chamber 155. While, in FIG. 1*f,* the inner segmented electrode 165 has a non-uniform cross-section (thickness) and substantially uniform capillary density (spacing) defined in the first dielectric along the longitudinal length of the reaction chamber 155. The cross-sectional thickness of the inner segmented electrode 165, the density (spacing) of the capillaries 195 defined in the first dielectric 170, and/or the diameter of the capillaries 195 in the first dielectric 170 may be varied along the longitudinal length of the reaction chamber to achieve substantially uniform flow therein.

In operation, the fluid to be treated enters the inlet 160 and passes into the hollow inner U-shaped segmented electrode 165. Once within the hollow portion of the inner segmented electrode 165, the fluid to be treated is received in the holes 146 defined in the electrode segments that comprise the inner electrode and passed out through the capillaries 195 defined in the first dielectric 170.

Figure 2A:
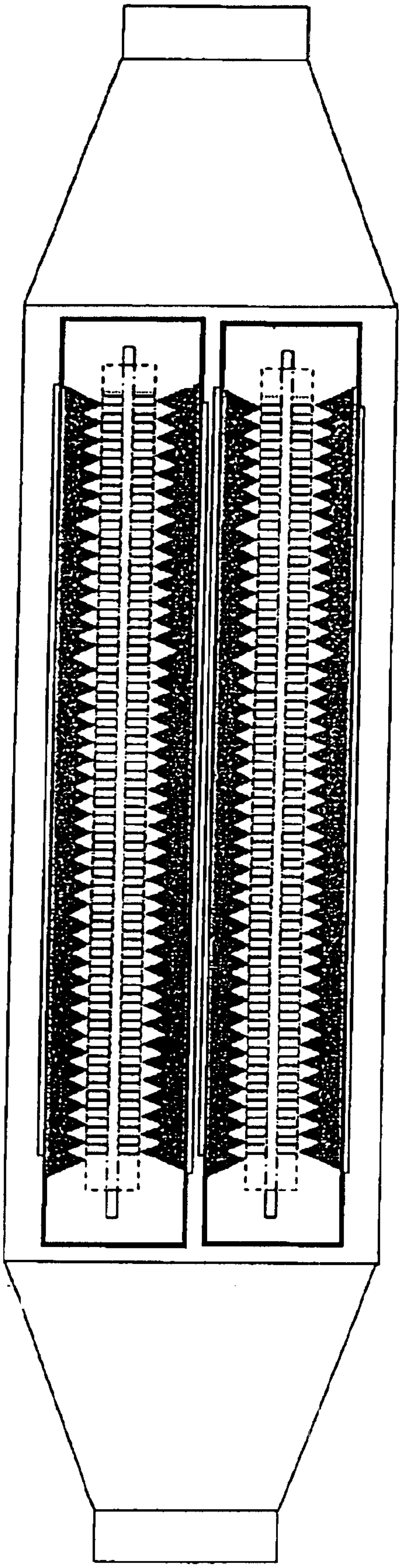
FIG. 2*a* is a cross-sectional longitudinal view of an exemplary embodiment of a system having two annular segmented electrode capillary discharge plasma reactors in accordance with the present invention.
Figure 2B:
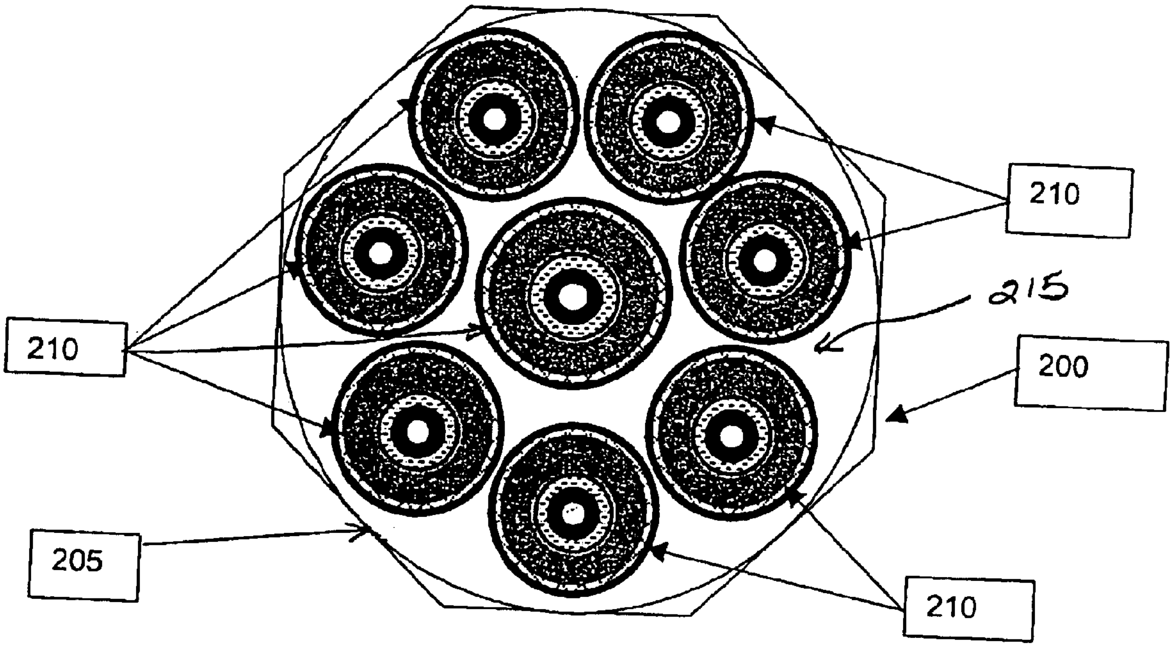
FIG. 2*b* is a cross-sectional lateral view of an exemplary embodiment of a system having eight annular segmented electrode capillary discharge plasma reactors in accordance with the present invention.

Multiple annular reactors may be combined in a single system. By way of example, FIG. 2*a* is a longitudinal cross-sectional view of a system having two annular reactors, while FIG. 2*b* shows a lateral cross-sectional view of a system having eight reactors 210 enclosed in a common housing 205. The space in the housing 205 between the reactors 210 is filled with a dielectric material 215 to ensure that all of the fluid to be treated passes through the plasma region 155 of a reactor 210. The system may be designed to include any number of reactors to be arranged as desired within the housing. This embodiment is particularly suited for the treatment of relatively large flow rates of fluid to be treated wherein a relatively large reactor system is desirable. By way of example, each reaction chamber shown in FIGS. 2*a* and 2*b* may be configured similar to that shown and described with respect to FIGS. 1*a*–1*f.*

Figures 3A, 3B:
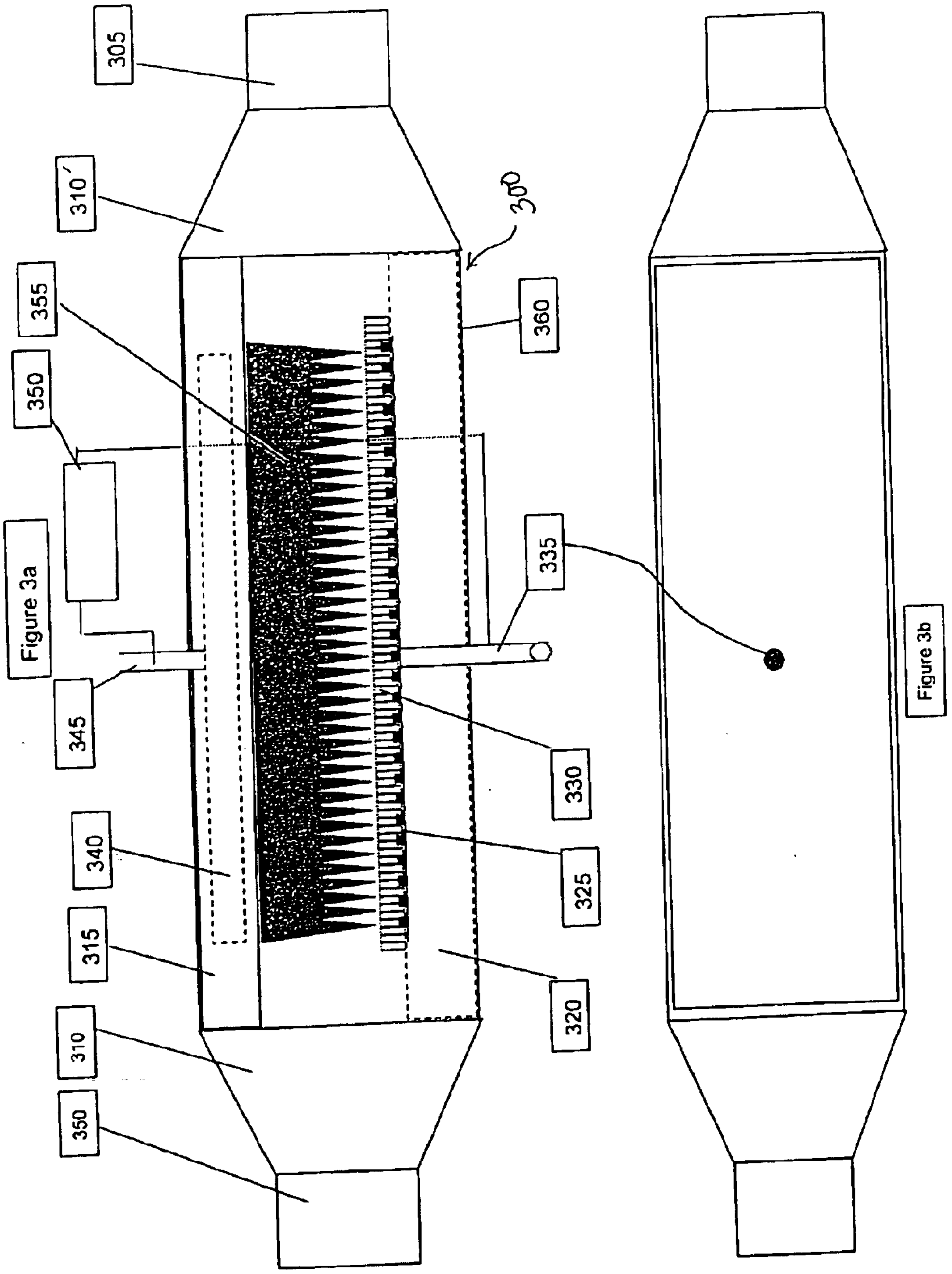
FIG. 3*a* is a cross-sectional longitudinal view of a single rectangular shaped segmented electrode capillary discharge plasma reactor system in accordance with the present invention.
FIG. 3*b* is a top view of the reactor of FIG. 3*a;*

Instead of the reactor having an annular or tubular shape as shown and described in the embodiments thus far, the reactor may have a rectangular shape as shown in FIGS. 3*a* and 3*b*. The dimensions, e.g., the length, width and gap length, of the reactor 300 may be modified, as desired, to accommodate specific applications. Reactor 300 has an inlet 350 connected to the reaction chamber by a transition conduit 310, as in the foregoing embodiments. The reaction chamber itself includes a second conductive electrode 340, preferably extending substantially the full width and length of the reaction chamber. Conductive electrode 340 is embedded in a second dielectric plate 315. A first dielectric plate 330 having holes or perforations therein that form capillaries is in direct contact with an inner segmented electrode 325 comprising a plurality of electrode segments. By way of example, each electrode segment is a hollow shaped ring or washer, as shown in FIGS. 1*c* and 1*d*. A hollow tube 335 is connected to the segmented electrode 325 that may be used as a conduit through which a supply of gases may be fed to improve the stability or optimize chemical reactions in the plasma. Chemical reactions take place in a plasma region that includes the capillaries defined in the first dielectric 330 as well as the area between the two dielectrics 315, 320. The treated fluid is discharged from the transition conduit 310' and through the outlet 305. The outside housing 360 of the reactor 300 is preferably made of a dielectric material.

Figure 4:
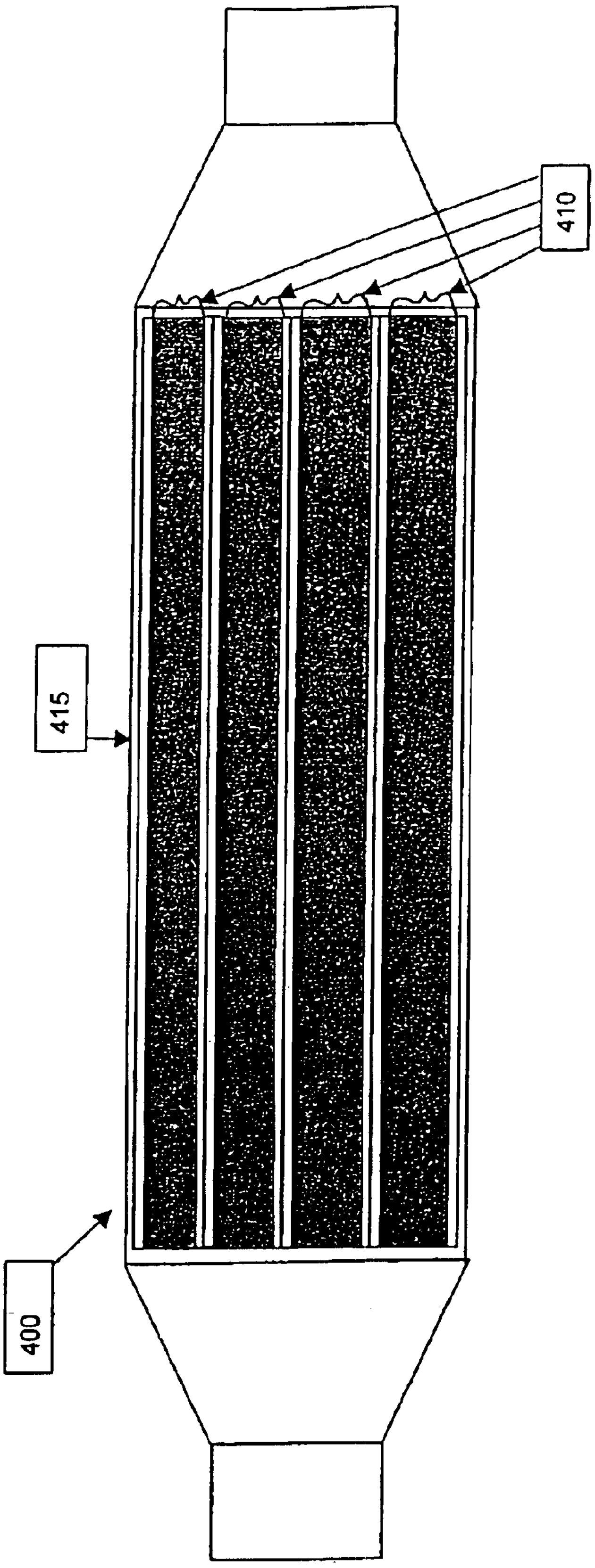
FIG. 4 is a cross-sectional longitudinal view of an exemplary system having multiple rectangular shaped segmented electrode capillary discharge plasma reactors in accordance with the present invention.

Multiple rectangular plate reactors such as the one shown in FIGS. 3*a* and 3*b* may be combined in a single reactor. FIG. 4, for example, shows a system 400 having four rectangular plate reactors 410 placed substantially parallel with respect to each other and encased in a common housing 415. The space within the housing 415 between the reactors 410 is filled with a dielectric material to ensure that all of the fluid to be treated is channeled through the plasma region of one of the reactors. This embodiment is particularly well suited for applications in which a relatively large flow rate of contaminated gas is to be treated and a relatively large combined reactor system is desirable.

In the embodiments shown in FIGS. 1–4, the dimensions of the reaction chamber may be selected as desired such that the residence time of the contaminants within the plasma regions is sufficient to ensure destruction of the contaminant to the desired level, for example, destruction down to the contaminants down to the molecular level.

Figure 5A:
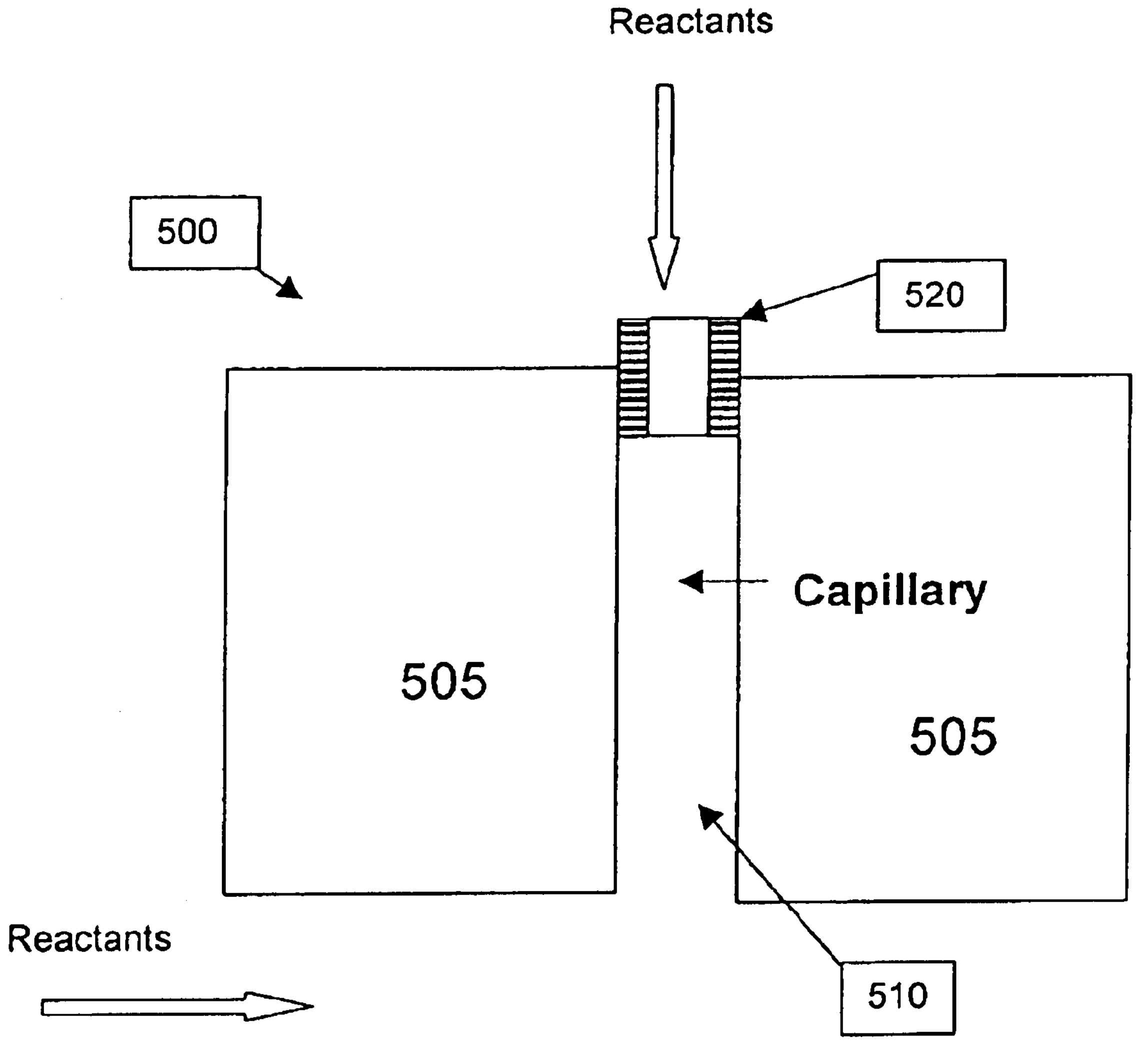
FIG. 5*a* is a cross-sectional view of an exemplary hollow pin electrode segment partially inserted into an associated capillary defined in the first dielectric.

Below are four exemplary reaction mechanisms that play an important role in plasma enhanced chemistry. Common to all mechanisms are electron impact dissociation and ionization to form reactive radicals. The four reaction mechanisms are summarized in the examples below:

(1) oxidation: e.g. conversion of $CH_4$ to $CO_2$ and $H_2O$ $e^-+O_2$®$e^-+O(^3P)+O(^1D)$ $O(^3P)+CH_4$®$CH_3+OH$ $CH_3+OH$®$CH_2+H_2O$ $CH_2+O_2$®$H_2O+CO$ $CO+O$®$CO_2$ (2) reduction: e.g. reduction of NO into $N_2$+O $e^-+N_2$®$e^-+N+N$ $N+NO$®$N_2+O$ (3) electron induced decomposition: e.g. dissociative electron attachment to $CCl_4$ $e^-+CCl_4$®$CCl_3+Cl^-$ $CCl_3+OH$®$CO+Cl_2+HCl$ (4) ion induced decomposition: e.g. decomposition of methanol $e^-+N_2$®$2e^{-+N}{}_2+$ $N_2^++CH_3OH$ ®$CH_3^++OH+N_2$ $CH_3^++OH$®$CH_2^++H_2O$ $CH_2^++O_2$®$H_2O+CO^+$ By way of example, in the foregoing embodiments the electrode segments comprising the segmented electrode have been shown and described as a hollow shaped ring or washer. However, the electrode segments may be configured in many different ways. FIGS. 5–8 show the configuration of a single electrode segment and an associated capillary in the first dielectric. Although only a single capillary and associated electrode segment is shown, the same electrode segment structure and arrangement may be used for a plasma reactor having multiple capillaries. FIG. 5*a* is a cross-sectional view of a first embodiment of a hollow pin or cylinder shaped electrode segment 520 inserted partially into a respective capillary 510 defined in a first dielectric 505. In an alternative embodiment, the electrode segment 520 may be disposed above, substantially flush with the dielectric, or extend any desired depth into the capillary 510. Since the electrode segment is hollow the fluid to be treated may be passed through the electrode segment and into the capillaries of the first dielectric and/or through a channel defined between the two dielectrics. Accordingly, treatment of the fluid by exposure to the plasma may occur in the capillaries and/or the channel.

Figure 6A:
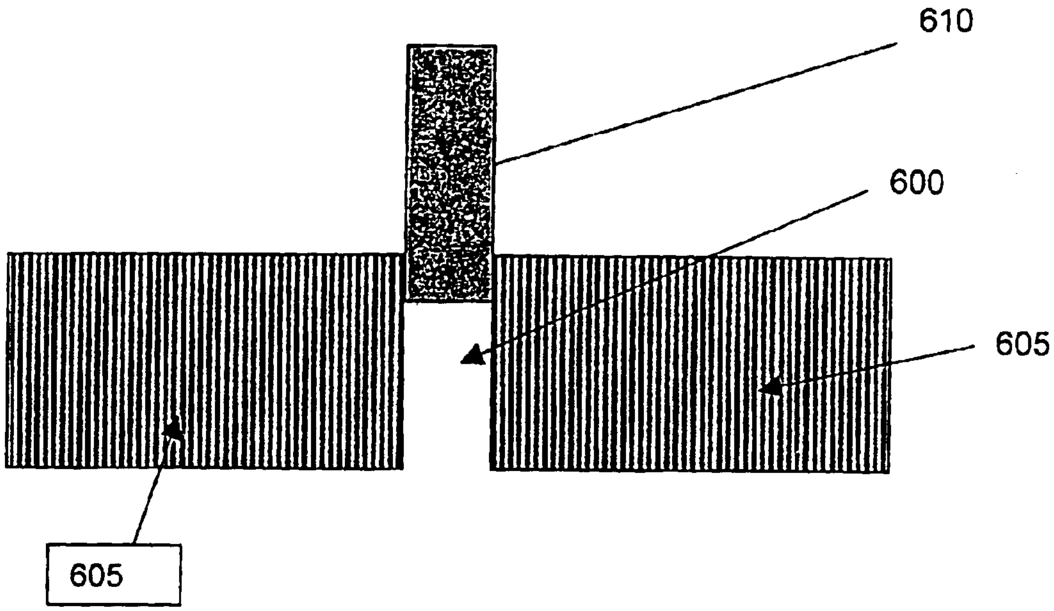
FIG. 6*a* is a cross-sectional view of an exemplary solid pin electrode segment having a blunt tip partially inserted into an associated capillary defined in the first dielectric.
Figure 6B:
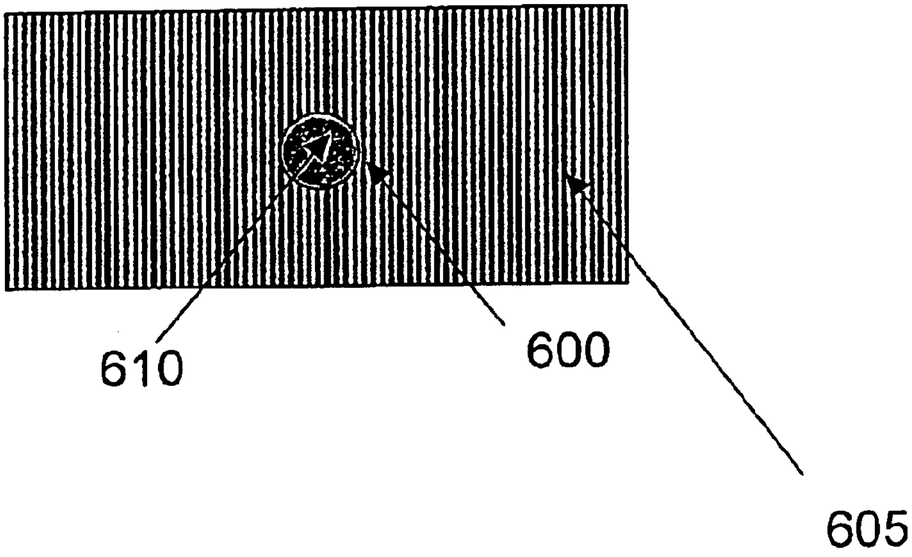
FIG. 6*b* is a top view of the electrode segment of FIG. 6*a;*

FIGS. 6*a* and 6*b* show a cross-sectional view and a top view, respectively, of a solid segmented electrode 610 in the shape of a pin inserted partially into a capillary 600 defined in a first dielectric 605. In an alternative embodiment, the electrode segment 610 may be disposed above, substantially flush with, or inserted to any desired depth into the capillary 600. The electrode segment 610 may be solid or porous. If a porous electrode 610 is used, the fluid to be treated may be passed directly through the electrode segment thereby optimizing its exposure to the plasma discharge that occurs within the capillary. Since the fluid to be treated when passed through the electrode segment may be treated by the plasma discharge created in the capillary 600 itself, in this case, the second electrode and second dielectric may be eliminated altogether. Another advantage to using a porous electrode 610 is that it also serves as a conduit for the supply of gas to improve the stability, optimize the chemical reactions with the plasma, or perform chemical reactions within the plasma.

Figure 7A:
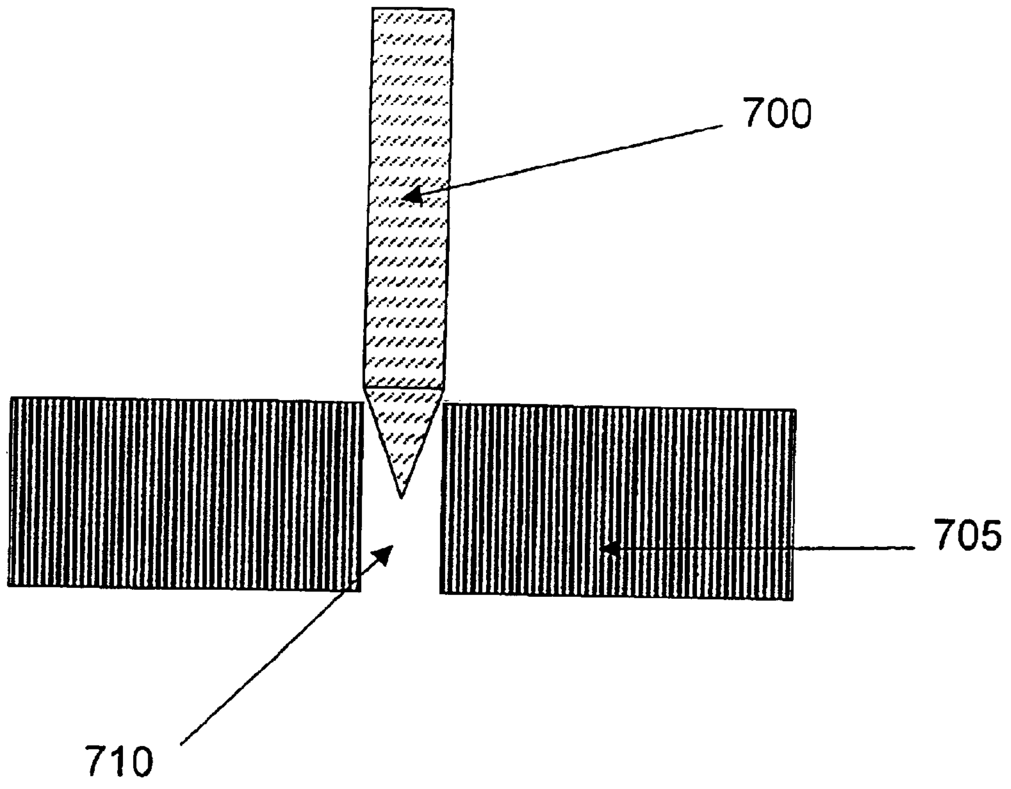
FIG. 7*a* is a cross-sectional view of an exemplary solid pin electrode segment having a pointed tip partially inserted into an associated capillary defined in the first dielectric.
Figure 7B:
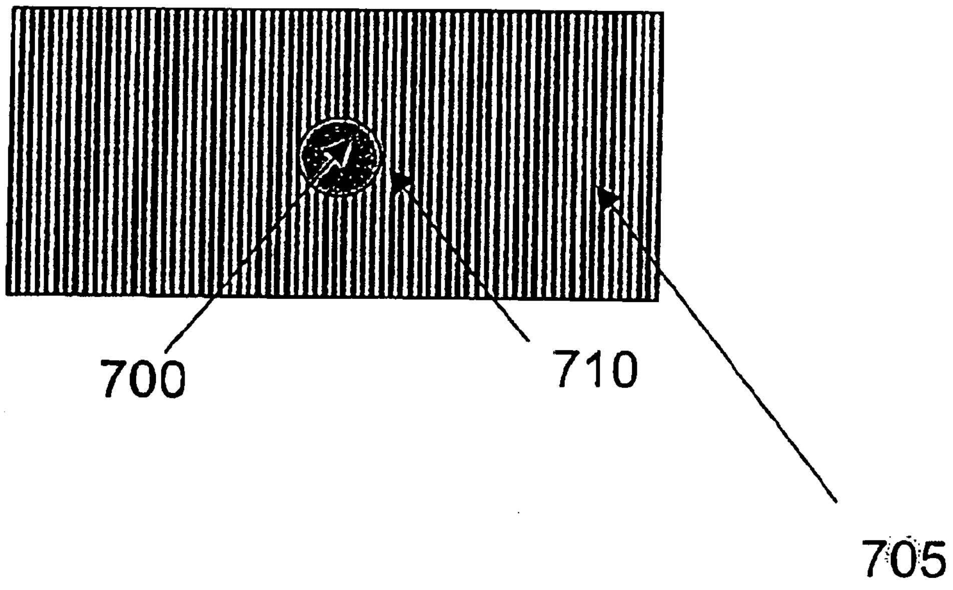
FIG. 7*b* is a top view of the electrode segment of FIG. 7*a;*

In FIGS. 6*a* and 6*b* the electrode segment has a blunt end, e.g., substantially flat, round, concave, or convex, whereas in an alternative embodiment shown in FIGS. 7*a* and 7*b* the electrode segment 700 terminates in a pointed tip. The exemplary electrode segment shown in both embodiments has a cylindrical shape, however, any desired shape may be used. Similarly, the shape and/or dimensions of the capillary 600, 710 need not correspond to that of the electrode segment 610, 700, respectively, but instead can be any shape, length, or angle of direction through the dielectric. FIGS. 6*b* and 7*b* are top views of the electrode segment and dielectric of FIGS. 6*a*, 7*a*, respectively. It is clear from the top views in FIGS. 6*b*, 7*b* that the diameter of the electrode segment 610, 700 is substantially equal to the diameter of the capillary 600, 710. The electrode segment and its respective capillary, however, need not be substantially equal in diameter. In addition, the thickness of the first dielectric need not be substantially uniform and can vary over the length of the reactor. The capillaries are used to sustain capillary plasma discharge and may also be used to introduce into the plasma region gases to stabilize the discharge, or deliver reactants to the origin of the plasma for the purpose of performing chemistry.

Figures 8A, 8B, 8C, 8D:
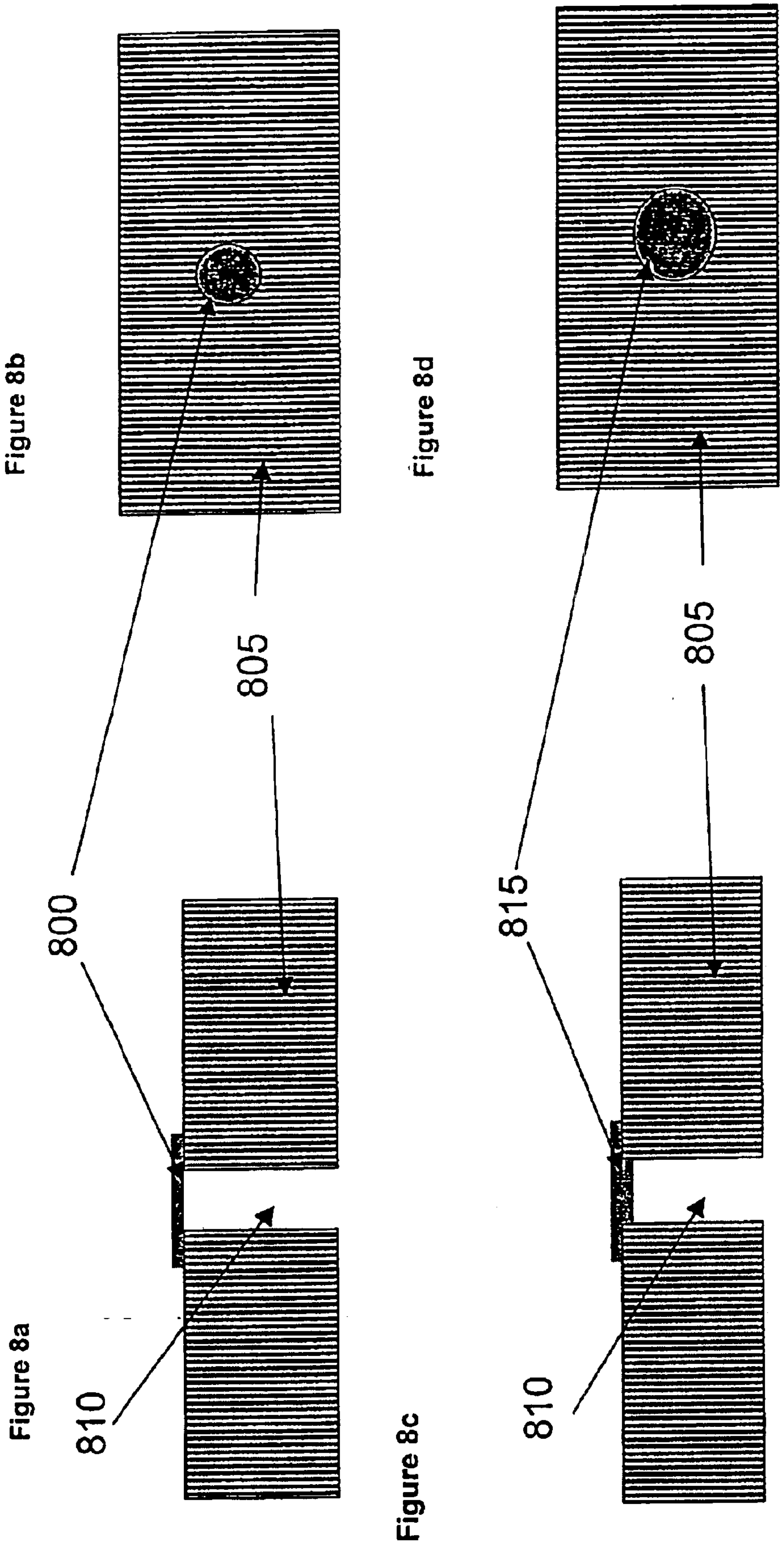
FIG. 8*a* is a cross-sectional view of an exemplary solid substantially flat electrode segment substantially flush with an associated capillary defined in the first dielectric.
FIG. 8*b* is a top view of the electrode segment of FIG. 8*a;*
FIG. 8*c* is a cross-sectional view of an exemplary solid substantially flat electrode segment a portion of which extends into an associated capillary defined in the first dielectric.
FIG. 8*d* is a top view of the electrode segment of FIG. 8*c;*
Figures 8E, 8F:
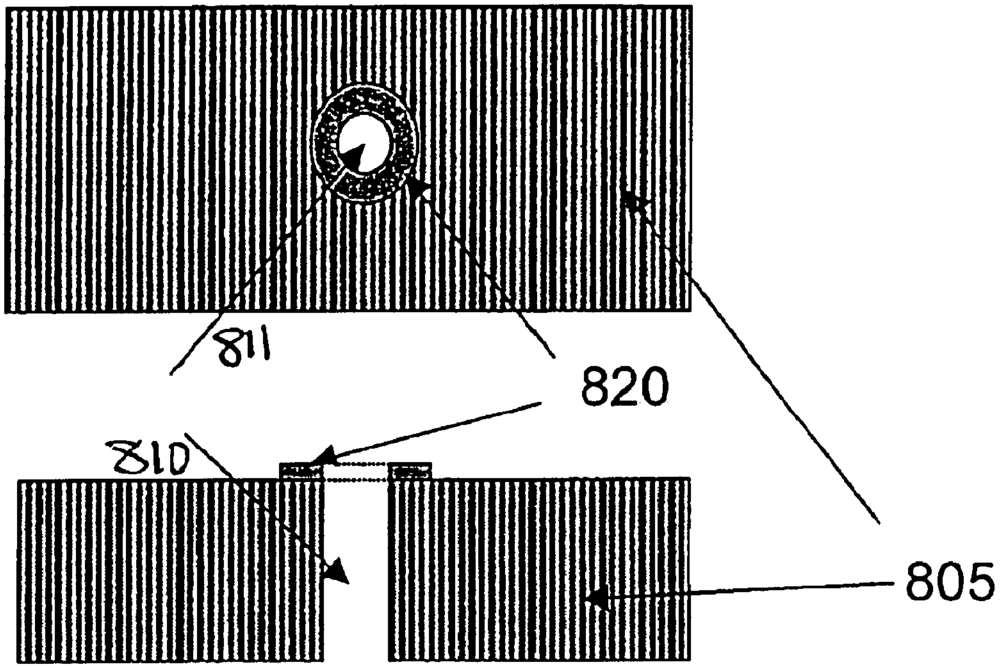
FIG. 8*e* is a cross-sectional view of an exemplary hollow substantially flat electrode segment substantially flush with an associated capillary defined in the first dielectric.
FIG. 8*f* is a top view of the electrode segment of FIG. 8*e;*

FIGS. 8*a*–8*e* show yet another embodiment of the configuration of the segmented electrode wherein each electrode is substantially flat, e.g., a washer, ring or disk. In particular, FIGS. 8*a* and 8*b* show a cross-sectional view and a top view, respectively, of a solid substantially flat electrode segment 800 in the shape of a disk that is disposed over the capillary 810 so as to be substantially flush and in contact with the first dielectric 805. Alternatively, as shown in FIGS. 8*c* and 8*d*, the solid substantially flat electrode segment may extend partially into the capillary 810. It is also within the intended scope of the invention to use a substantially flat electrode segment 820 having a hole 811 defined therein to form a ring or washer, as shown in FIGS. 8*e* and 8*f*.

Different configurations for the electrode segment and its associated capillary may be used based on the following conditions: i) whether the electrode segment is solid, hollow, or porous; ii) the outer and/or inner shape of the electrode segment; iii) the dimensions of the electrode segment; and iv) whether the electrode segment is disposed above, substantially flush with the dielectric, or inserted at a predetermined depth into the capillary.

The portion of the reaction chamber shown in FIG. 1*d* includes a second dielectric 115, whereas the second dielectric has been omitted in the embodiments shown in FIGS. 5*a*, 5*b*, 6*a*, 6*b*, 7*a*, 7*b*, 8*a*–8*f*. Any of these configurations in which the segmented electrode is hollow or made of a porous material may be implemented with or without a second dielectric and second electrode.

Figure 9A:
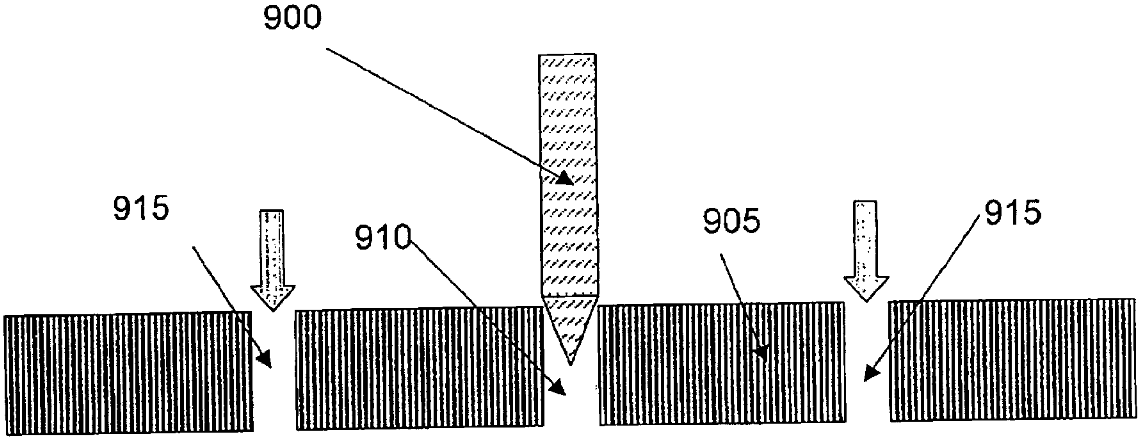
FIG. 9*a* is a cross-sectional view of an electrode segment associated with one capillary of the first dielectric also having auxiliary channels defined therein.
Figure 9B:
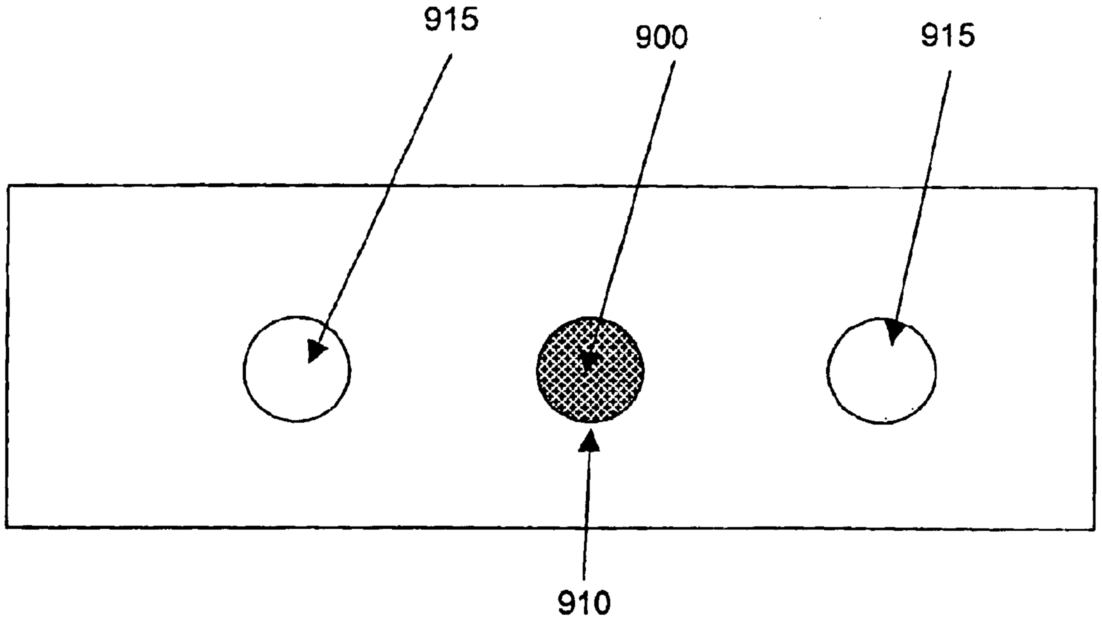
FIG. 9*b* is a top view of the embodiment of FIG. 9*a;*
Figure 10A:
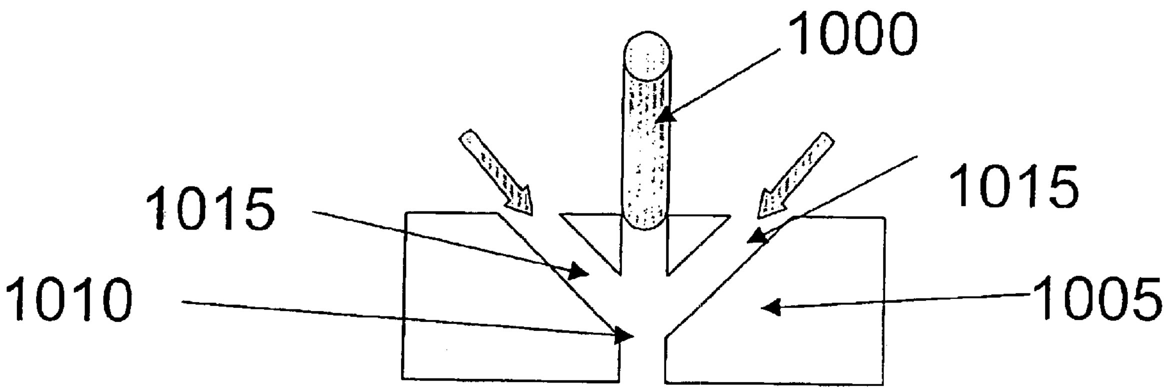
FIG. 10*a* is a cross-sectional view of an alternative embodiment of an electrode segment associated with one capillary of a first dielectric having auxiliary channels in fluid communication with the capillary.
Figure 10B:
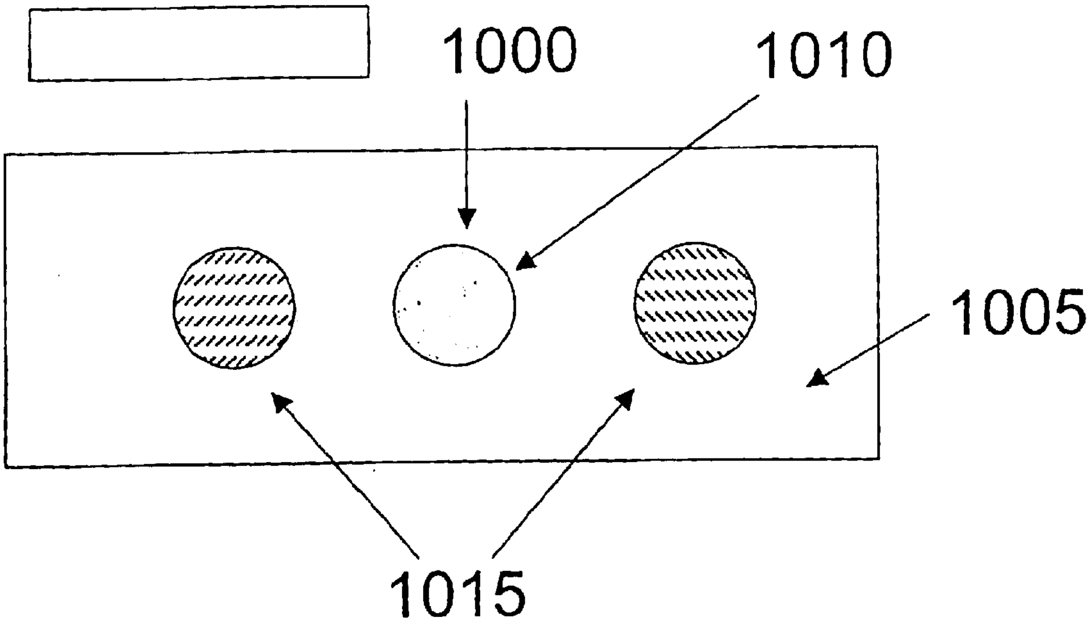
FIG. 10*b* is a top view of the embodiment of FIG. 10*a;*

It is also within the intended scope of the invention to define auxiliary channels of any shape, dimension, or angle of direction in the first dielectric that do not have an associated electrode segment. FIGS. 9*a* and 9*b* show a cross-sectional view and a top view, respectively, of an exemplary solid annular (pin) electrode having a pointed tip that is partially inserted into a capillary 910. Auxiliary channels 915 are defined in the dielectric 905 substantially parallel to the capillary 910 into which the electrode segment 900 has been inserted. Fluids may be introduced into the auxiliary channels 915 to stabilize the plasma discharge or deliver reactants to the plasma for improving the chemical reactions. The auxiliary channels 915 may be defined in the dielectric at any desired angle. FIGS. 10*a* and 10*b* show two auxiliary channels 1015 defined in the dielectric 1005 so as to be in fluid communication with the capillary 1010.

Each of the aforementioned segmented electrode configurations have been shown and described by way of example. The features of each embodiment may be modified or combined with those of other embodiments as desired. The invention is not to be limited to the particular shape, dimension, number, or orientation of the electrodes or capillaries shown by way of example in the figures.

Figure 11:
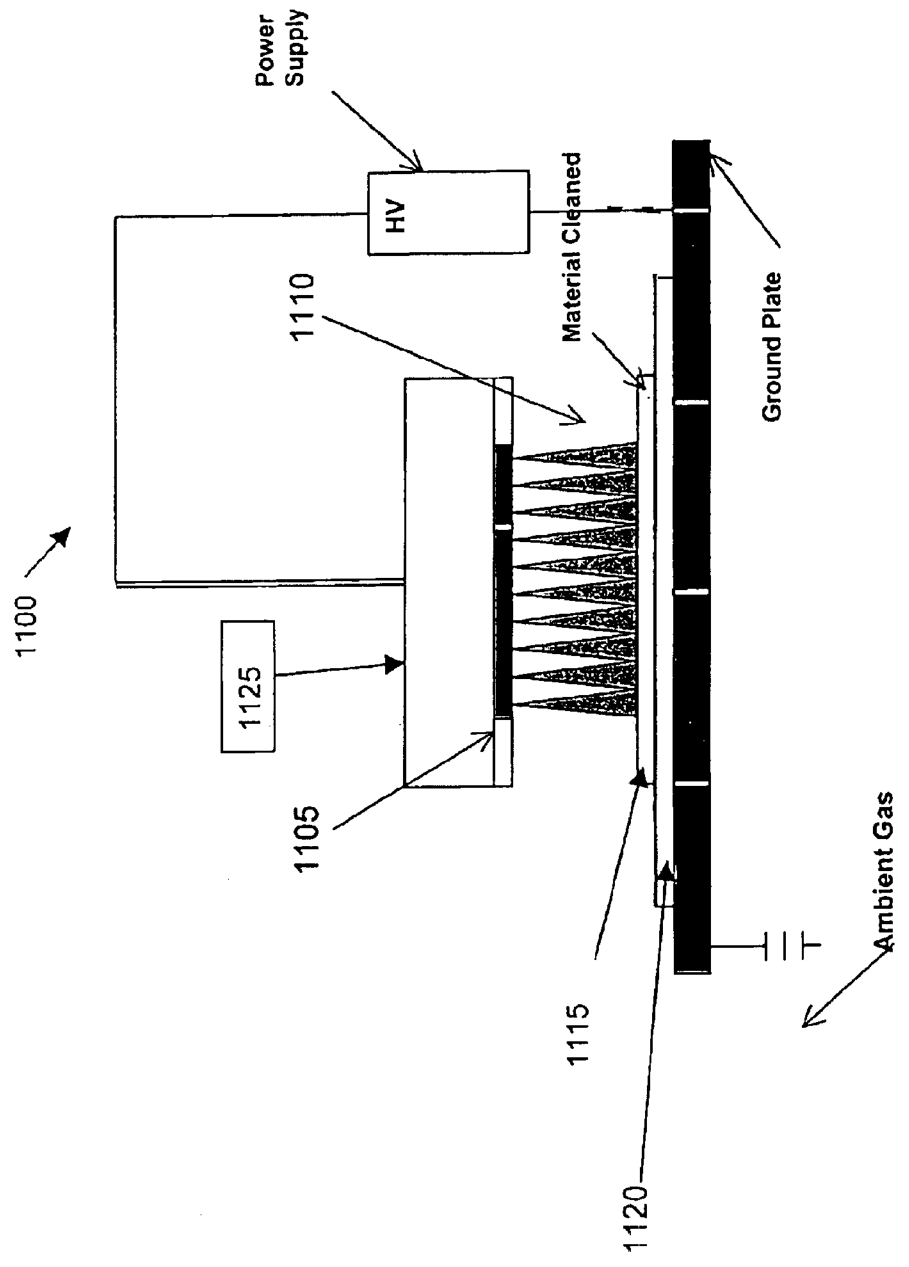
FIG. 11 is an exemplary surface cleaning system in accordance with the present invention.

The aforementioned embodiments have been described with reference to the treatment or purification of a contaminated fluid. Another application for the use of the plasma reactor in accordance with the present invention is for treating or cleaning a solid or porous surface. FIG. 11 is a schematic diagram of an exemplary surface cleaning system in accordance with the present invention. System 1100 includes a reactor 1125 including a perforated dielectric plate and a segmented electrode together represented as 1105. The segmented electrode and dielectric plate may be configured in accordance with any of the embodiments described above. Plasma is generated in the capillaries and discharged therefrom in the form of plasma jets 1110. An object is positioned so that the surface of the object to be cleaned is exposed to the plasma jets 1110. In the embodiment shown in FIG. 11, the object 1115 to be cleaned is positioned between two dielectrics 1105, 1120. Alternatively, the second dielectric 1120 may be eliminated, as described above.

Figure 12A:
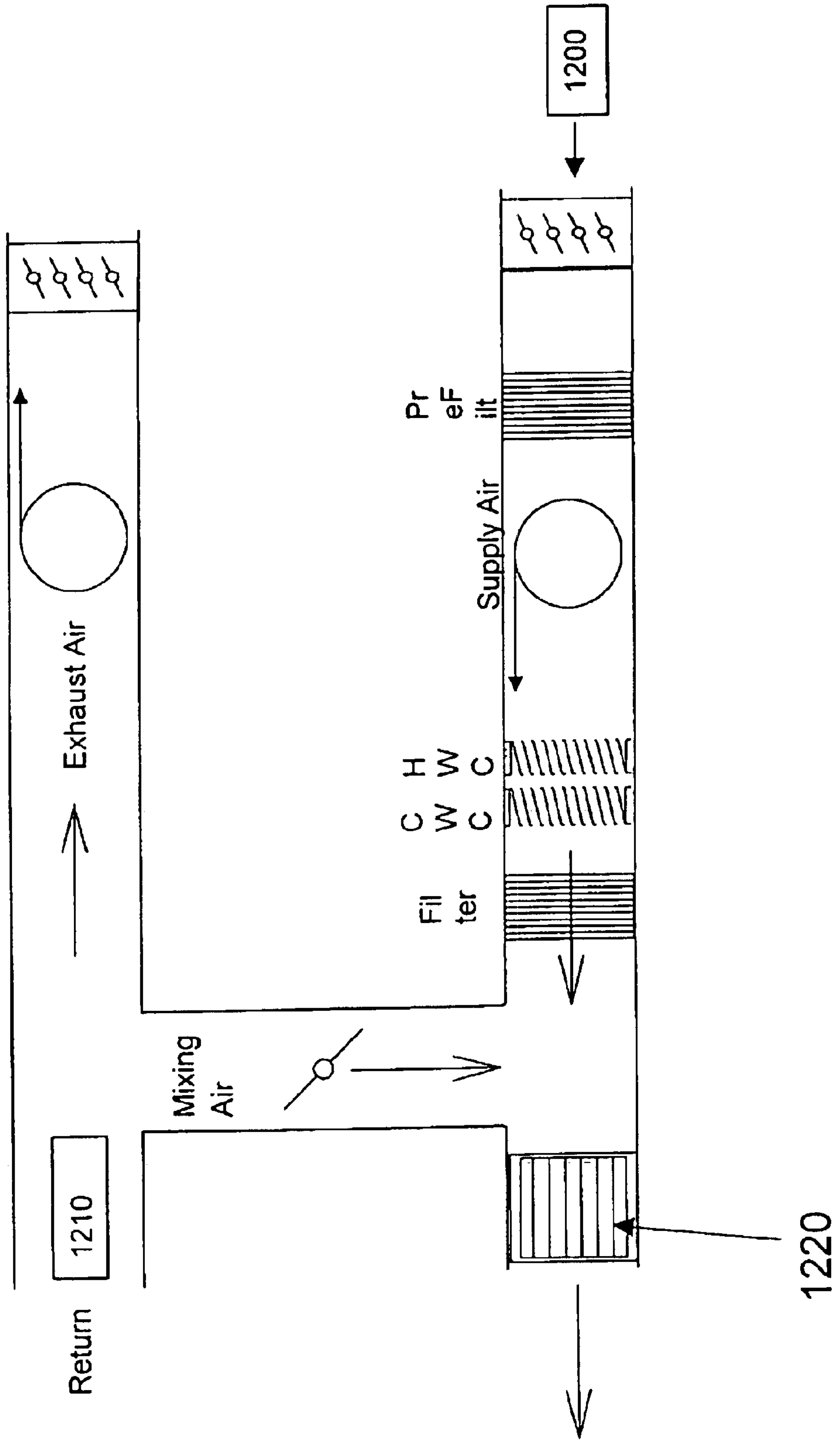
FIG. 12*a* is a schematic diagram of an exemplary air handler with a segmented electrode capillary discharge plasma reactor in accordance with the present invention.
Figure 12B:
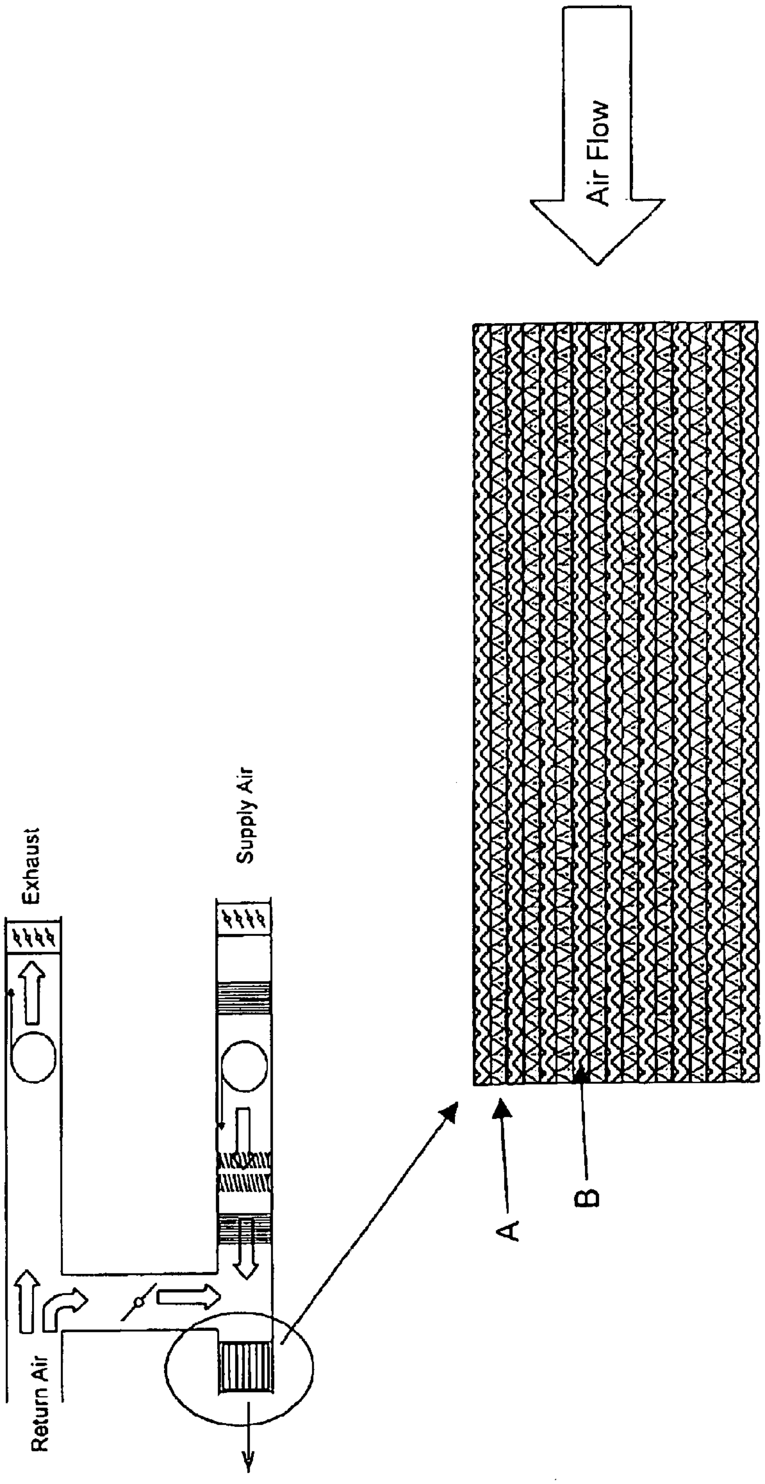
FIG. 12*b* is an enlarged view of the segmented electrode capillary discharge plasma reactor in FIG. 12*a.*

In yet another application, the segmented electrode capillary discharge plasma system may be used to purify gases. FIG. 12*a* is a schematic diagram of an exemplary air handler with a segmented electrode capillary discharge plasma device for cleaning contaminated gases. The air to be purified is received in the inlet 1200, mixes with air from a return inlet 1210, and then passes through a segmented electrode capillary discharge plasma air cleaning device 1220 before exiting the system. FIG. 12*b* is an enlarged view of an exemplary segmented electrode capillary discharge plasma air cleaning device 1220 that includes a plurality of segmented electrodes and opposing perforated dielectric plates arranged substantially parallel to one another. Plasma regions are formed between the segmented electrode and opposing dielectric plates. In the exemplary embodiment shown in FIG. 12*a* the segmented electrode capillary discharge plasma air cleaning device 1220 is arranged after the supply air and mixing air are combined. The reactor system could alternatively be designed so that the segmented electrode capillary discharge plasma air cleaning device 1220 is arranged at any one location or at multiple locations within the system.

The segmented electrode capillary discharge, non-thermal plasma reactors in accordance with the present invention can be used to perform a variety of chemical reactions by exposing a fluid or surface containing the desired reactants to the high density plasma region where various processes such as oxidation, reduction, ion induced decomposition, or electron induced decomposition efficiently allow for chemical reactions to take place. The fluid to be treated may be fed either through the channel between the two dielectrics (transversely to the flow of the plasma discharged from the capillaries of the dielectric) and/or through the capillaries themselves (the point of origin of the plasma). Examples of reactions include: chemistry on various organic compounds such as Volatile Organic Compounds (VOCs) either single compounds or mixtures thereof; semi-volatile organic compounds, Oxides of Nitrogen (NOx), Oxides of Sulfur (SOx), high toxic organics, and any other organic compound that can be in the form of vapors of aerosols. In addition, the reactor can be used to pretreat combustion air to inhibit formation of Nox and increase fuel efficiency. Additional uses of the plasma includes the generation of ozone and ultraviolet light, and treatment of contaminated surfaces.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. Method of treating a fluid in a plasma reactor including a first dielectric having at least one capillary defined therethrough, the capillary having a proximal end and an opposite distal end through which plasma is discharged, and a segmented electrode including a plurality of electrode segments, each electrode segment disposed proximate and in fluid communication with the proximal end of an associated capillary, said method comprising the steps of:

passing the fluid to be treated through at least one electrode segment and capillary; and exposing in the capillary the fluid to be treated to a plasma discharge prior to exiting from the distal end of the capillary.

2. The method in accordance with claim 1, wherein the electrode segment is hollow.

3. The method in accordance with claim 1, wherein the electrode segment is made of a porous material.

4. The method in accordance with claim 1, further comprising the steps of:

passing the fluid to be treated through a channel defined between the first dielectric and a second dielectric; and exposing in the channel the fluid to be treated to a plasma discharged from the capillary.

5. The method in accordance with claim 1, wherein said exposing step further comprises suppressing a glow-to-arc discharge at atmospheric pressure regardless of the presence of a carrier gas.

6. The method in accordance with claim 1, wherein at least one of the plural electrode segments is hollow to allow the passage of the fluid to be treated therethrough.

7. The method in accordance with claim 1, wherein at least one of the plural electrode segments is made of a porous material to allow the passage of the fluid to be treated therethrough.

8. Method of treating a fluid in a plasma reactor including a first dielectric having at least one capillary defined therethrough, and a segmented electrode including a plurality of electrode segments, each electrode segment disposed proximate and in fluid communication with an associated capillary, at least one of the plural electrode segments is adapted to allow passage of a fluid to be treated therethrough, said method comprising the steps of:

passing the fluid to be treated through a channel defined between the first dielectric and a second dielectric; and exposing in the channel the fluid to be treated to a plasma discharged from the capillary.

9. The method in accordance with claim 8, wherein said exposing step further comprises suppressing a glow-to-arc discharge at atmospheric pressure regardless of the presence of a carrier gas.

10. Method of treating a fluid in a plasma reactor including a first dielectric having at least one capillary defined therethrough, the capillary having a proximal end and an opposite distal end through which plasma is discharged, and a segmented electrode including a plurality of electrode segments, each electrode segment disposed proximate and in fluid communication with an associated capillary, said method comprising the steps of:

passing the fluid to be treated through at least one electrode segment and capillary; and exposing in the capillary the fluid to be treated to a plasma discharge prior to exiting from the distal end of the capillary while suppressing glow-to-arc discharge.

11. The method in accordance with claim 10, wherein said exposing step further comprises suppressing a glow-to-arc discharge at atmospheric pressure regardless of the presence of a carrier gas.

12. Method of treating a fluid in a plasma reactor including a first dielectric having at least one capillary defined therethrough, and a segmented electrode including a plurality of electrode segments, each electrode segment disposed proximate and in fluid communication with an associated capillary, at least one of the plural electrode segments is adapted to allow passage of a fluid to be treated therethrough, said method comprising the steps of:

passing the fluid to be treated through a channel defined between the first dielectric and a second dielectric; and exposing in the channel the fluid to be treated to a plasma discharged from the capillary while suppressing glow-to-arc discharge.

13. The method in accordance with claim 12, wherein said exposing step further comprises suppressing a glow-to-arc discharge at atmospheric pressure regardless of the presence of a carrier gas.

14. A plasma reactor comprising:

a first dielectric having at least one capillary defined therethrough; and a segmented electrode including a plurality of electrode segments, only a single electrode segment being disposed proximate and in fluid communication with an associated capillary, at least one of the plural electrode segments is adapted to allow passage of a fluid to be treated therethrough.

15. The plasma reactor in accordance with claim 14, wherein at least one of said electrode segments is shaped as a pin.

16. The plasma reactor in accordance with claim 15, wherein said pin has a blunt tip oriented proximate the capillary.

17. The plasma reactor in accordance with claim 15, wherein said pin has a pointed tip oriented proximate the capillary.

18. The plasma reactor in accordance with claim 14, wherein at least one of said electrode segments is shaped as a substantially flat ring having a hole defined therethrough.

19. The plasma reactor in accordance with claim 14, wherein at least one of said electrode segments is shaped as a substantially flat disk.

20. The plasma reactor in accordance with claim 19, wherein said at least one electrode segment is solid.

21. The plasma reactor in accordance with claim 19, wherein said at least one electrode segment is porous.

22. The plasma reactor in accordance with claim 14, wherein said at least one electrode segment is porous.

23. The plasma reactor in accordance with claim 14, wherein said at least one electrode segment is hollow.

24. The plasma reactor in accordance with claim 14, wherein at least one of said electrode segments is disposed proximate and separated a predetermined distance from said first dielectric.

25. The plasma reactor in accordance with claim 14, wherein at least one of said electrode segments is disposed substantially flush and in contact with said first dielectric.

26. The plasma reactor in accordance with claim 14, wherein at least one of said electrode segments is partially inserted into the capillary.

27. The plasma reactor in accordance with claim 14, wherein at least one of said electrode segments is fully inserted into the capillary.

28. The plasma reactor in accordance with claim 14, further comprising:

a second electrode; and a second dielectric proximate said second electrode, said first and second dielectrics being separated by a predetermined distance to form a channel therebetween.

29. The plasma reactor in accordance with claim 28, wherein said second electrode is a substantially planar plate.

30. The plasma reactor in accordance with claim 28, wherein said second electrode is a segmented electrode including a plurality of electrode segments.

31. The plasma reactor in accordance with claim 14, the first dielectric has a plurality of capillaries defined therethrough, the capillaries being arranged so that spacing between adjacent capillaries is substantially equal.

32. The plasma reactor in accordance with the first dielectric has a plurality of capillaries defined therethrough, the capillaries being arranged so that spacing between adjacent capillaries is not equal.

33. The plasma reactor in accordance with claim 14, wherein said segmented electrode has a substantially uniform thickness.

34. The plasma reactor in accordance with claim 14, wherein said segmented electrode has a non-uniform thickness.

35. The plasma reactor in accordance with claim 14, wherein said first dielectric has an auxiliary channel defined therethrough.

36. The plasma reactor in accordance with claim 14, where said first dielectric has an auxiliary channel defined therein and in fluid communication with the capillary.

37. The plasma reactor in accordance with claim 14, wherein the capillary suppresses glow-to-arc discharge at atmospheric pressure regardless of the presence of a carrier gas.

38. The plasma reactor in accordance with claim 14, wherein the capillary has a proximal end and an opposite distal end through which plasma is discharged, the electrode segment being disposed proximate and in fluid communication with the proximal end of the capillary.

39. A plasma reactor comprising:

a first dielectric having at least one capillary defined therethrough; and a segmented electrode including a plurality of electrode segments, only a single electrode segment being disposed proximate and in fluid communication with an associated capillary so that the capillary suppresses glow-to-arc discharge, at least one of the plural electrode segments is adapted to allow passage of a fluid to be treated therethrough.

40. The plasma reactor in accordance with claim 39, wherein the capillary serves as a current choke suppressing glow-to-arc discharge at atmospheric pressure regardless of the presence of a carrier gas.

* * * * *